US012188590B2

(12) United States Patent
Hackett et al.

(10) Patent No.: US 12,188,590 B2
(45) Date of Patent: Jan. 7, 2025

(54) BRACKET FOR FLEXIBLE HOSE

(71) Applicant: Tyco Fire Products LP, Cranston, RI (US)

(72) Inventors: Robert Hackett, Cranston, RI (US); Eric Wanyo, Cranston, RI (US); Jung Woon Taek, Ansan-si (KR); Jun Yong Chul, Ansan-si (KR); Gary Cook, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 18/554,166

(22) PCT Filed: Jun. 27, 2022

(86) PCT No.: PCT/US2022/035124
§ 371 (c)(1),
(2) Date: Oct. 5, 2023

(87) PCT Pub. No.: WO2023/278328
PCT Pub. Date: Jan. 5, 2023

(65) Prior Publication Data
US 2024/0377001 A1    Nov. 14, 2024

Related U.S. Application Data

(60) Provisional application No. 63/216,330, filed on Jun. 29, 2021.

(51) Int. Cl.
F16L 3/24         (2006.01)
A62C 35/68      (2006.01)
(Continued)

(52) U.S. Cl.
CPC ............ *F16L 3/1075* (2013.01); *A62C 35/68* (2013.01); *B05B 15/60* (2018.02); *F16L 3/02* (2013.01);
(Continued)

(58) Field of Classification Search
CPC ..... F16L 3/02; F16L 3/24; F16L 3/105; A62C 35/68; A65C 31/28; B05B 15/60; B05B 15/62; B05B 15/20
See application file for complete search history.

(56) References Cited

U.S. PATENT DOCUMENTS 8,474,199 B2 *   7/2013   Oh .......................... A62C 35/68
                                                                    52/506.07
2011/0154755 A1   6/2011   Oh
(Continued)

FOREIGN PATENT DOCUMENTS

JP    H07-035267 A    2/1995
JP    2012-010833 A   1/2012
(Continued)

OTHER PUBLICATIONS

Korean Intellectual Property Office as International Searching Authority; International Search Report and Written Opinion; International Patent Application No. PCT/US2022/035124; Oct. 17, 2022; 11 pages.

*Primary Examiner* — Tan Le
(74) *Attorney, Agent, or Firm* — Foley & Lardner LLP

(57) ABSTRACT

Systems and methods herein are directed to a bracket assembly. The bracket assembly can include a first bracket portion, a second bracket portion, or a sliding mechanism. The first bracket portion can include a first end with a first protruding portion, a second protruding portion, and an opening that extends between the first and second protruding portions, or a second end. The opening can receive a portion of a flexible hose assembly. The second end can receive a (Continued)

portion of a lateral support bar. The second bracket portion can be slidably coupled with the first bracket portion through the sliding mechanism by a pin. The sliding mechanism can include an aperture to receive the pin. The sliding mechanism can move in a lateral direction between the first protruding portion and the second protruding portion of the first end of the first bracket portion about the pin within the aperture.

18 Claims, 21 Drawing Sheets

(51) Int. Cl.
    *B05B 15/60*     (2018.01)
    *F16L 3/08*     (2006.01)
    *F16L 3/10*     (2006.01)
    *F16L 3/02*     (2006.01)

(52) U.S. Cl.
    CPC ............... *F16L 3/08* (2013.01); *F16L 3/1033* (2013.01); *F16L 3/24* (2013.01)

(56) References Cited

U.S. PATENT DOCUMENTS

| | | | |
|---|---|---|---|
| 2013/0133902 A1 | 5/2013 | Stimpson et al. | |
| 2015/0377386 A1* | 12/2015 | Mitchell | ................... F16L 3/24 29/428 |
| 2018/0099167 A1* | 4/2018 | Dafoneseca | ........... A62C 35/62 |
| 2022/0390041 A1* | 12/2022 | Park | ....................... F16B 7/0433 |

FOREIGN PATENT DOCUMENTS

| | | | |
|---|---|---|---|
| KR | 10-2195038 B1 | 12/2020 | |
| WO | WO-2011105831 A2 * | 9/2011 | ............. A62C 35/68 |

\* cited by examiner

BRACKET FOR FLEXIBLE HOSE

CROSS-REFERENCE TO RELATED APPLICATIONS

The present application claims the benefit of and priority to U.S. Provisional Application No. 63/216,330, filed Jun. 29, 2021, the disclosure of which is incorporated herein by reference in its entirety.

BACKGROUND

Sprinkler systems can be provided in areas to address fire conditions. Sprinkler systems can include fire protection sprinklers that connect with piping systems to receive fluid to address the fire conditions. The piping systems can include flexible hoses.

SUMMARY

At least one aspect relates to a flexible hose support bracket assembly. The flexible hose support bracket assembly can include a first bracket portion. The first bracket portion can include a first end or a second end. The first end can include a first protruding portion, a second protruding portion, and an opening that extends between the first and second protruding portions. The opening can receive a portion of a flexible hose assembly. The second end can receive a portion of a lateral support bar. The flexible hose support bracket assembly can include a second bracket portion. The second bracket portion can be slidably coupled with the first bracket portion. The flexible hose support assembly can include a sliding mechanism. The sliding mechanism can be slidably coupled with the first bracket portion by one or more pins. The sliding mechanism can include an aperture to receive the one or more pins. The sliding mechanism can move in a lateral direction between the first protruding portion and the second protruding portion of the first end of the first bracket portion about the one or more pins. The sliding mechanism can move between an open position and a closed position.

At least one aspect relates to a flexible hose support bracket assembly. The flexible hose support bracket assembly can include an interior bracket portion. The interior bracket portion can include a recessed portion. The recessed portion can receive a portion of a flexible hose assembly. The flexible hose support bracket assembly can include an exterior bracket portion. The exterior bracket portion can enclose the interior bracket portion. The exterior bracket portion can receive a portion of a lateral support bar. The interior bracket portion can be slidably coupled with the exterior bracket portion by a pin movable within an aperture positioned on the exterior bracket portion. The interior bracket portion can move in a lateral direction within the aperture between an open position and a closed position.

At least one aspect relates to a method of securing a flexible hose assembly. The method can include receiving, via a bracket assembly, a portion of a lateral support bar. The method can include receiving, via the bracket assembly, a portion of the flexible hose assembly. The method can include sliding, via a slide mechanism, a first end of the bracket assembly in a lateral direction relative to a second end of the bracket assembly from an open position to a closed position. The method can include compressing, via an actuator, the bracket assembly to inhibit movement of the portion of the flexible hose assembly within the bracket assembly.

At least one aspect relates to a flexible hose support bracket assembly. The flexible hose support bracket assembly can include a bracket portion. The bracket portion can include a first end with a first protruding portion, a second protruding portion, and an opening extending between the first protruding portion and the second protruding portion. The opening can receive a portion of a flexible hose assembly. The bracket portion can include a second end that can receive a portion of a lateral support bar. The flexible hose support bracket assembly can include a sliding mechanism slidably coupled with the bracket portion. The sliding mechanism can move in a lateral direction between the first protruding portion and the second protruding portion of the first end of the bracket portion between an open position and a closed position.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

The present disclosure generally relates to fire sprinkler systems. More particularly, the present disclosure relates to a flexible hose and components that can be installed with various fittings, such as a sprinkler, with greater speed, such as by reducing or avoiding the need to use tools or pipe tape to properly secure the flexible hose and components within a fire sprinkler system.

Flexible hose bracket assemblies according to the present disclosure can include a first bracket portion that encloses a second bracket portion. The first bracket portion can include a first end with two protruding portions that receive, surround, and enclose a portion of a flexible hose assembly, such as an outlet reducer. The first bracket portion can include a second end that can receive a portion of a lateral support bar. The bracket assembly can include an actuator that, when activated, can cause the lateral support bar to engage with a portion of the second bracket portion such that the second bracket portion makes contact with a portion of the flexible hose assembly. The contact between the second bracket portion and a portion of the flexible hose assembly can cause the bracket assembly to maintain the flexible hose assembly in position.

Figure 1:
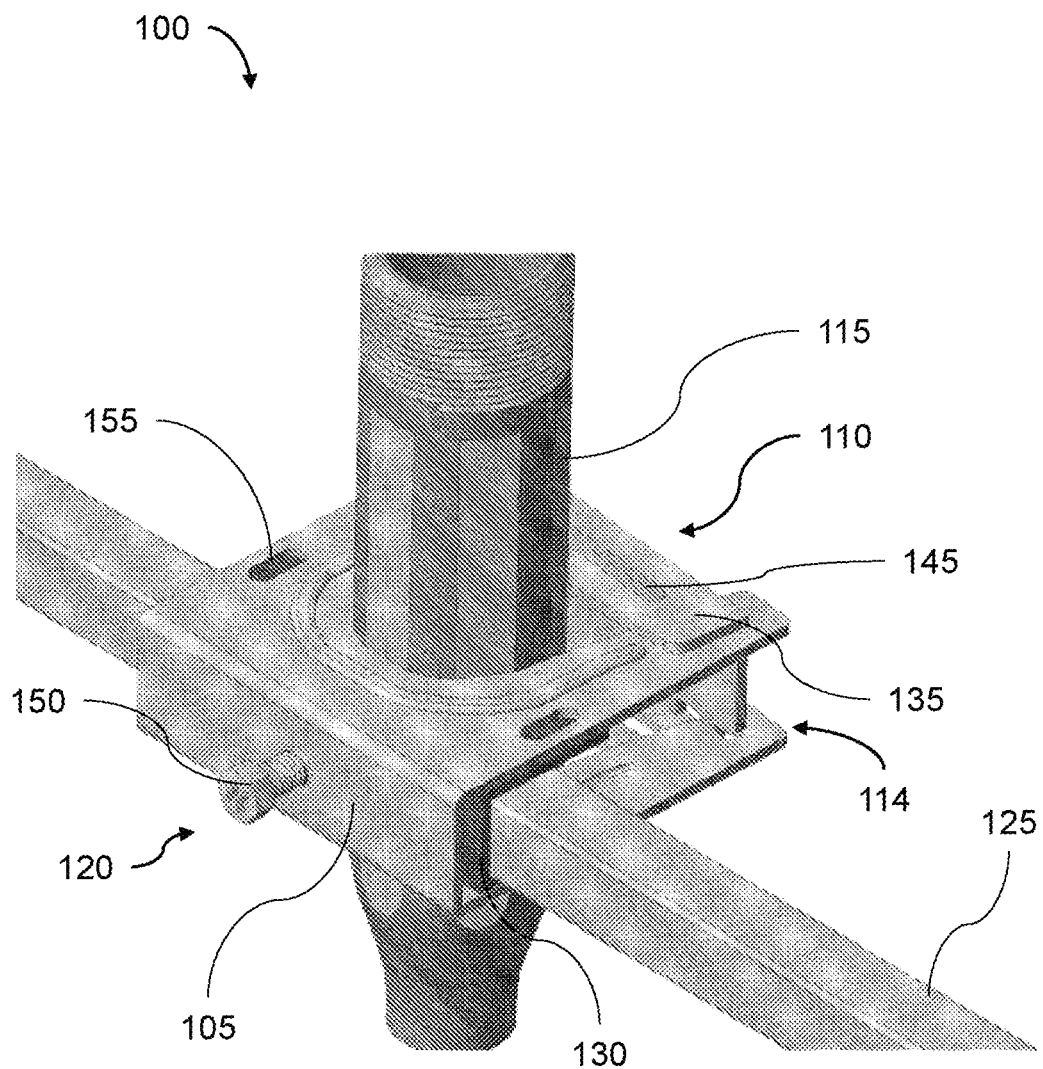
FIG. 1 depicts a perspective view of a portion of a flexible hose support bracket assembly, according to an exemplary implementation.
Figure 2:
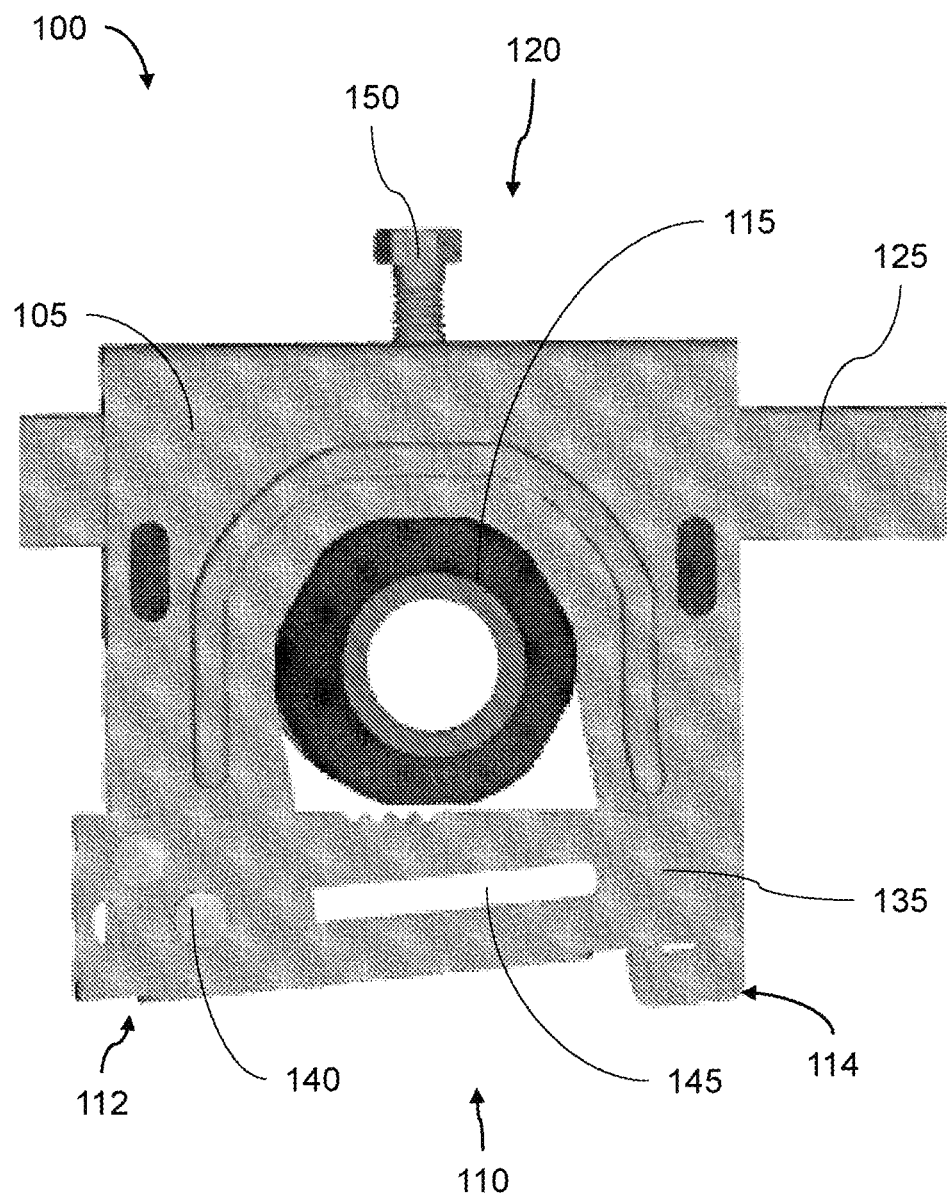
FIG. 2 depicts a top view of a portion of the flexible hose support bracket assembly of FIG. 1, according to an exemplary implementation.
Figure 3:
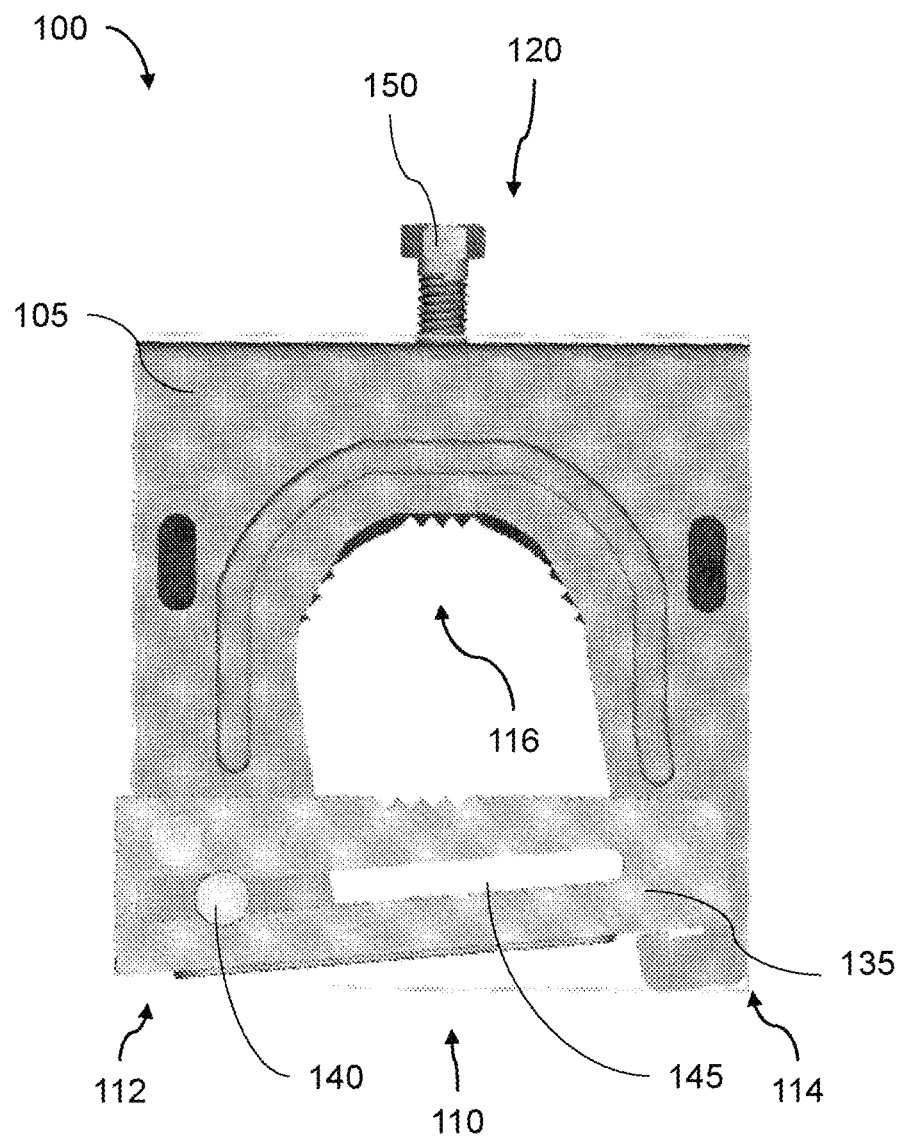
FIG. 3 depicts a top view of a portion of the flexible hose support bracket assembly of FIG. 1, according to an exemplary implementation.

FIG. 1 depicts an example of a flexible hose support bracket assembly 100. For example, the bracket assembly 100 can include a first bracket portion 105. The first bracket portion 105 can include a first end 110 and a second end 120. As shown in FIGS. 2 and 3, and among others, the first end 110 can receive a portion of a flexible hose assembly 115. For example, the first end 110 can include a first protruding portion 112, a second protruding portion 114, and an opening 116 extending between the first protruding portion 112 and the second protruding portion 114. The opening 116 can receive a portion of the flexible hose assembly 115. For example, the flexible hose assembly 115 can include a portion of an outlet receiver to be coupled with a flexible hose for a fire sprinkler. The first protruding portion 112 and the second protruding portion 114 can be any struts, projections, teeth, or otherwise protruding sections that extend generally from the second end 120 of the first bracket portion 105 to the first end 110 of the first bracket portion 105 such that the first protruding portion 112 and the second protruding portion 114 can enclose a portion of the flexible hose assembly 115.

The second end 120 can receive a portion of a lateral support bar 125. The second end 120 can include one or more components for receiving a portion of the lateral support bar 125. For example, a portion of the lateral support bar 125 can be slid into a side portion of the second end 120 of the first bracket portion 105. A portion of the lateral support bar 125 can be slid into a side portion of the second bracket portion 130 within the first bracket portion 105, as depicted throughout the figures. While the portion of the lateral support bar 125 depicted in the figures extends past the bracket assembly 100, a portion of the lateral support bar 125 received by the second end 120 of the first bracket portion 105 could be larger or smaller according to other implementations.

The bracket assembly 100 can include a second bracket portion 130. The second bracket portion 130 can be slidably attached to the first bracket portion 105. For example, the second bracket portion 130 can be coupled to the first bracket portion 105 such that the second bracket portion 130 can move relative to the first bracket portion 105. The second bracket portion 130 can be coupled with the first bracket portion 105 through a slot and jut mechanism 155 positioned on the first bracket portion 105. In some examples, the second bracket portion 130 can be coupled with the first bracket portion 105 through various other sliding joints such that the second bracket portion 130 can slide relative to the first bracket portion 105.

The first bracket portion 105 can enclose the second bracket portion 130. For example, the second bracket portion 130 can be coupled with an internal portion of the first bracket portion 105, as depicted throughout the figures. The second bracket portion 130 can be coupled with an internal portion of the first bracket portion 105 such that the second bracket portion 130 can move within the first bracket portion 105 relative to the first bracket portion 105. In some examples, the first bracket portion 105 and the second bracket portion 130 can be or can include one continuous structure (e.g., the first bracket portion 105 depicted in at least FIGS. 11-20).

Figure 4:
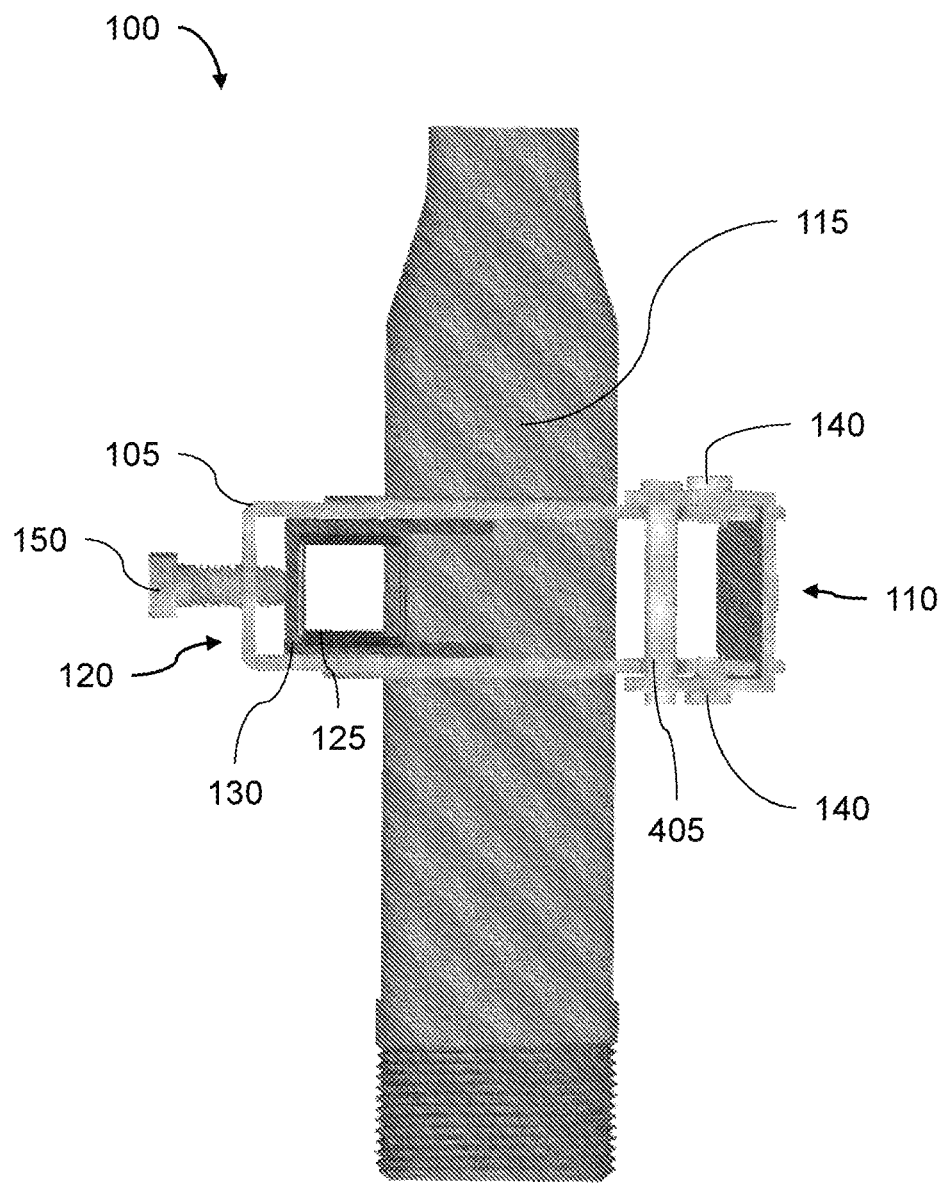
FIG. 4 depicts a side view of a portion of the flexible hose support bracket assembly of FIG. 1, according to an exemplary implementation.

The first bracket portion 105 can fully enclose the second bracket portion 130 such that the second bracket portion 130 includes at least one edge flush with at least one edge of the first bracket portion 105, as shown throughout the figures. As depicted in FIG. 4, the second bracket portion 130 can receive a portion of the lateral support bar 125 at the second end 120 of the first bracket portion 105 such that at least one section of the lateral support bar 125 is flush with a portion of the second bracket portion 130.

The bracket assembly 100 can include a sliding mechanism 135. The sliding mechanism 135 can be slidably attached to the first bracket portion 105. For example, the sliding mechanism 135 can include an aperture 145 (e.g., slot, slit, hole, opening) for receiving a portion of the first bracket portion 105, such as a pin 140. Rather than pivoting about the pin 140, the sliding mechanism 135 can be coupled with the pin 140 such that the sliding mechanism 135 can move in a lateral direction between the first protruding portion 112 and the second protruding portion 114 about the pin 140. The pin 140 can be or can include any pivot or sliding point for the sliding mechanism 135 to move relative to the first bracket portion 105.

Figure 5:
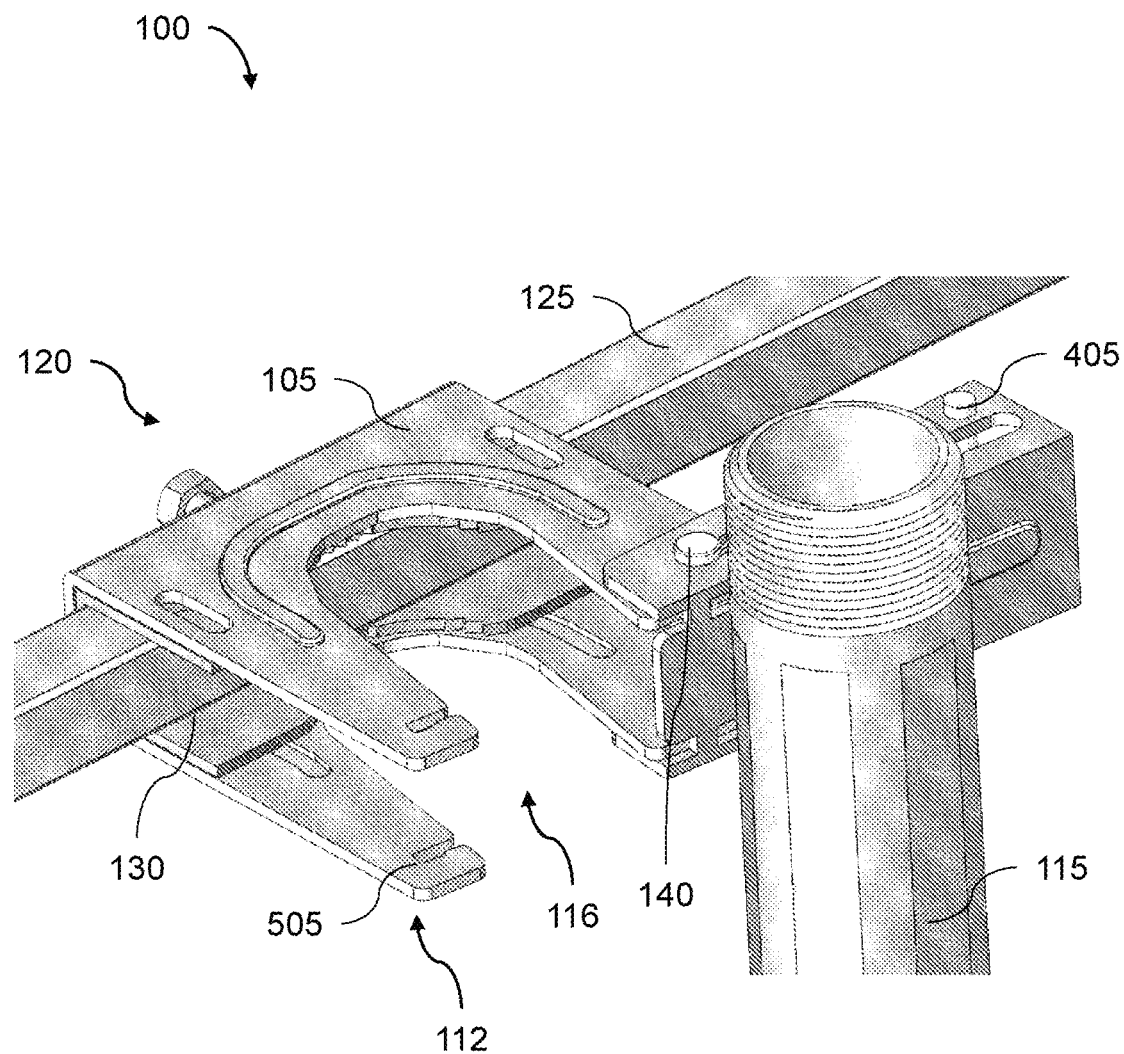
FIG. 5 depicts a perspective view of a portion of the flexible hose support bracket assembly of FIG. 1 in an open position, according to an exemplary implementation.

The sliding mechanism 135 can slide between an open position and a closed position. For example, the sliding mechanism 135 can slide such that the bracket assembly 100 reaches an open position in which a portion of the flexible hose assembly 115 can be received by the first end 110 of the first bracket portion 105, as depicted in FIG. 5. The sliding mechanism 135 can slide such that the bracket assembly 100 reaches a closed position such that the bracket assembly 100 cannot receive a portion of the flexible hose assembly 115, or such that a portion of the flexible hose assembly 115 can be maintained within the opening 116, as depicted in at least FIG. 2.

Figure 6:
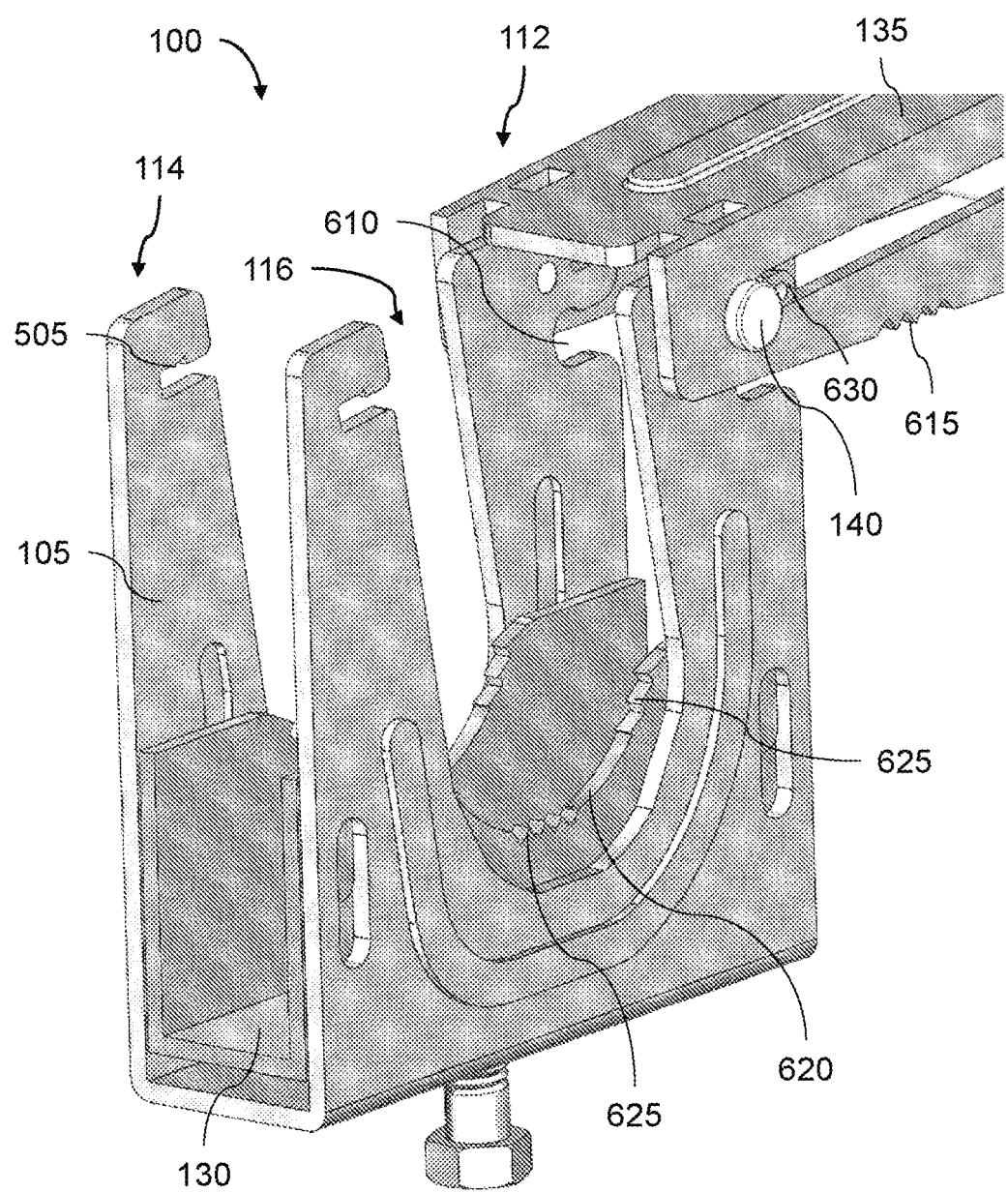
FIG. 6 depicts a perspective view of a portion of the flexible hose support bracket assembly of FIG. 1 in an open position, according to an exemplary implementation.
Figure 7:
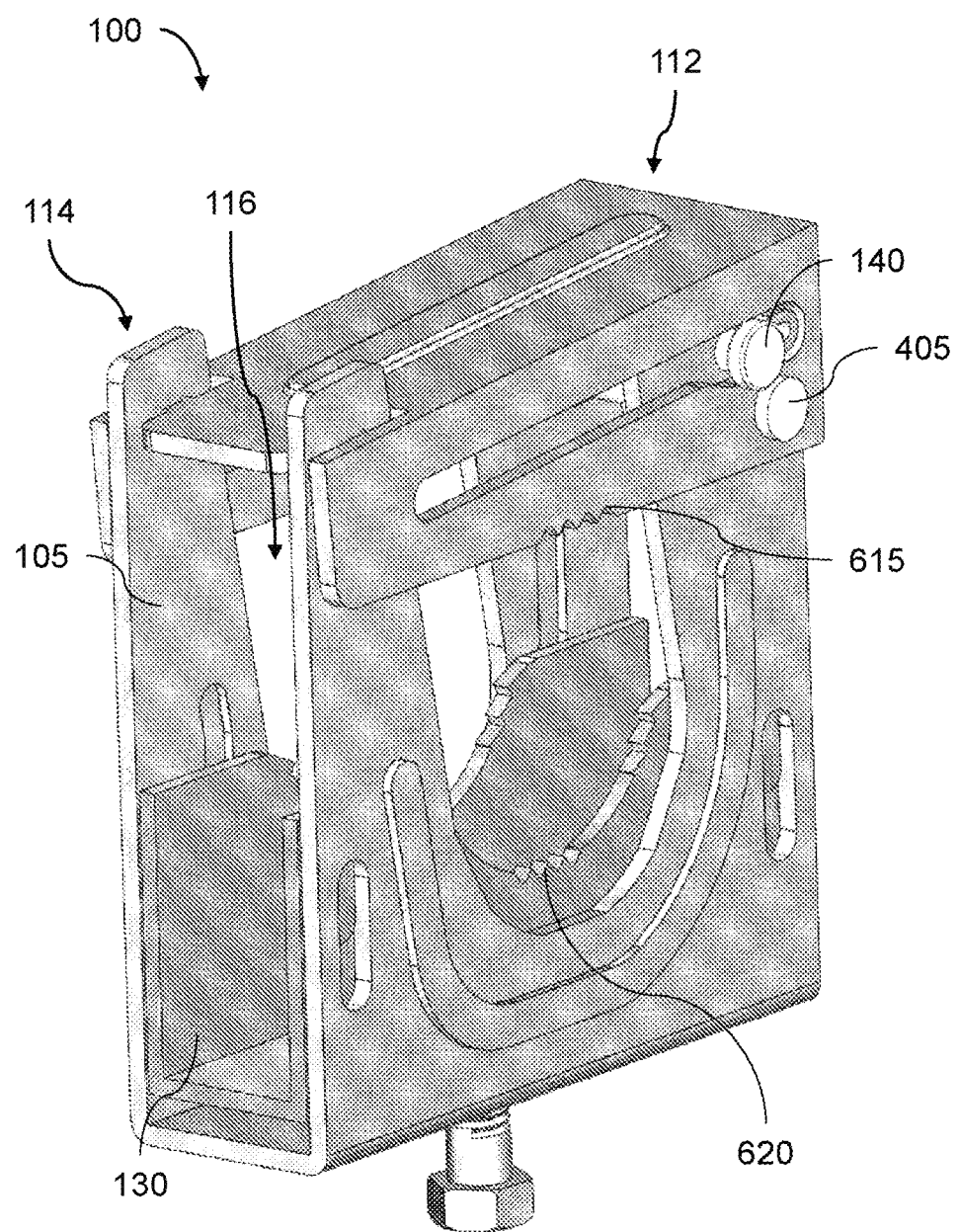
FIG. 7 depicts a perspective view of a portion of the flexible hose support bracket assembly of FIG. 1 in a closed position, according to an exemplary implementation.

As depicted in FIGS. 5-7, and among others, the first bracket portion 105 can include a retention slot 505 for receiving a portion of the sliding mechanism 135. For example, the retention slot 505 can be any aperture, hole, notch, or otherwise open space such that a portion of the sliding mechanism 135 can fit within the retention slot 505. The retention slot 505 can inhibit the sliding mechanism 135 from pivoting relative to the first bracket portion 105. For example, the retention slot 505 can be positioned on the second protruding portion 114, opposite the pin 140, such that the retention slot 505 prevents the sliding mechanism 135 from moving in a direction that is substantially perpendicular to the lateral direction in which the sliding mechanism 135 can move between the first protruding portion 112 and the second protruding portion 114.

As depicted in FIGS. 4-7, and among others, the first bracket portion 105 can include a notch 610 for receiving a portion of the sliding mechanism 135. For example, the notch 610 can be any aperture, hole, slot, or otherwise open space such that a portion of the sliding mechanism 135 can fit within the notch 610. For example, the sliding mechanism 135 can include a stopper 405. The stopper 405 can be slid into the notch 610 when the sliding mechanism 135 is slid into the closed position. The stopper 405 can engage with the notch 610 such that the stopper 405 prevents the sliding mechanism 135 from pivoting relative to the first bracket portion 105. According to one implementation, the stopper 405 can be a pin coupled with the sliding mechanism 135. According to another implementation, the stopper 405 can be various other components coupled with or attached to the sliding mechanism 135 to be received by the notch 610.

As shown throughout the figures, the bracket assembly 100 can include an actuator 150. The actuator 150 can facilitate movement of the second bracket portion 130 relative to the first bracket portion 105. For example, when the actuator 150 is activated, the actuator 150 can cause the second bracket portion 130 to move a portion of the lateral support bar 125 within the bracket assembly 100 in a direction towards a portion of the flexible hose assembly 115 within the opening 116 such that a portion of the lateral support bar 125 and the second bracket portion 130 engage with a portion of the flexible hose assembly 115. When the actuator 150 is released, the actuator 150 can cause the second bracket portion 130 to move away from a portion of the flexible hose assembly 115 such that a portion of the lateral support bar 125 and the second bracket portion 130 may not engage with a portion of the flexible hose assembly 115 within the opening 116. According to one example, the actuator 150 can be a fastener, such as a screw, as shown throughout the figures. According to other examples, the actuator 150 can include various other components that facilitate movement of the second bracket portion 130 between a compressed position and an uncompressed position.

The actuator 150 can be coupled with the second end 120 of the first bracket portion 105. For example, as shown throughout the figures, the actuator 150 can be coupled with the second end 120 of the first bracket portion 105 such that the actuator 150 is positioned on an end of the bracket assembly 100 that is opposite the opening 116. While the actuator 150 shown in the figures is positioned on the exterior of the first bracket portion 105, the actuator 150 may be positioned in various other positions of the second end 120 of the first bracket portion 105 in other examples.

As depicted in FIG. 6, the second bracket portion 130 can include a recessed portion 620 to interface with a portion of the flexible hose assembly 115. The recessed portion 620 can include at least one serrated edge portion 625 to engage with a portion of the flexible hose assembly 115. For example, the serrated edge portion 625 can include a protrusion, projection, tooth, or otherwise jagged portion to engage with a portion of the flexible hose assembly 115 when the actuator 150 compresses the second bracket portion 130 towards a portion of the flexible hose assembly 115. The serrated edge portion 625 can engage with a portion of the flexible hose assembly 115 such that a portion of the flexible hose assembly 115 maintains within the opening 116 when the bracket assembly 100 is in the closed position.

As depicted in FIG. 6, the sliding mechanism 135 can include at least one serrated edge portion 615. For example, the serrated edge portion 615 can include a protrusion, projection, tooth, or otherwise jagged portion to engage with a portion of the flexible hose assembly 115 when the bracket assembly 100 is in the closed position and when the actuator 150 moves the second bracket portion 130 into the compressed position. The sliding mechanism 135 can include at least one protrusion 630. The protrusion 630 can facilitate preventing the sliding mechanism 135 from pivoting (e.g., such that the sliding mechanism 135 moves in a substantially lateral direction and may not pivot relative to the pin 140). For example, the protrusion 630 can include an oblong shape in a lateral direction to facilitate guiding lateral movement of the sliding mechanism 135 relative to the pin 140.

Figure 8:
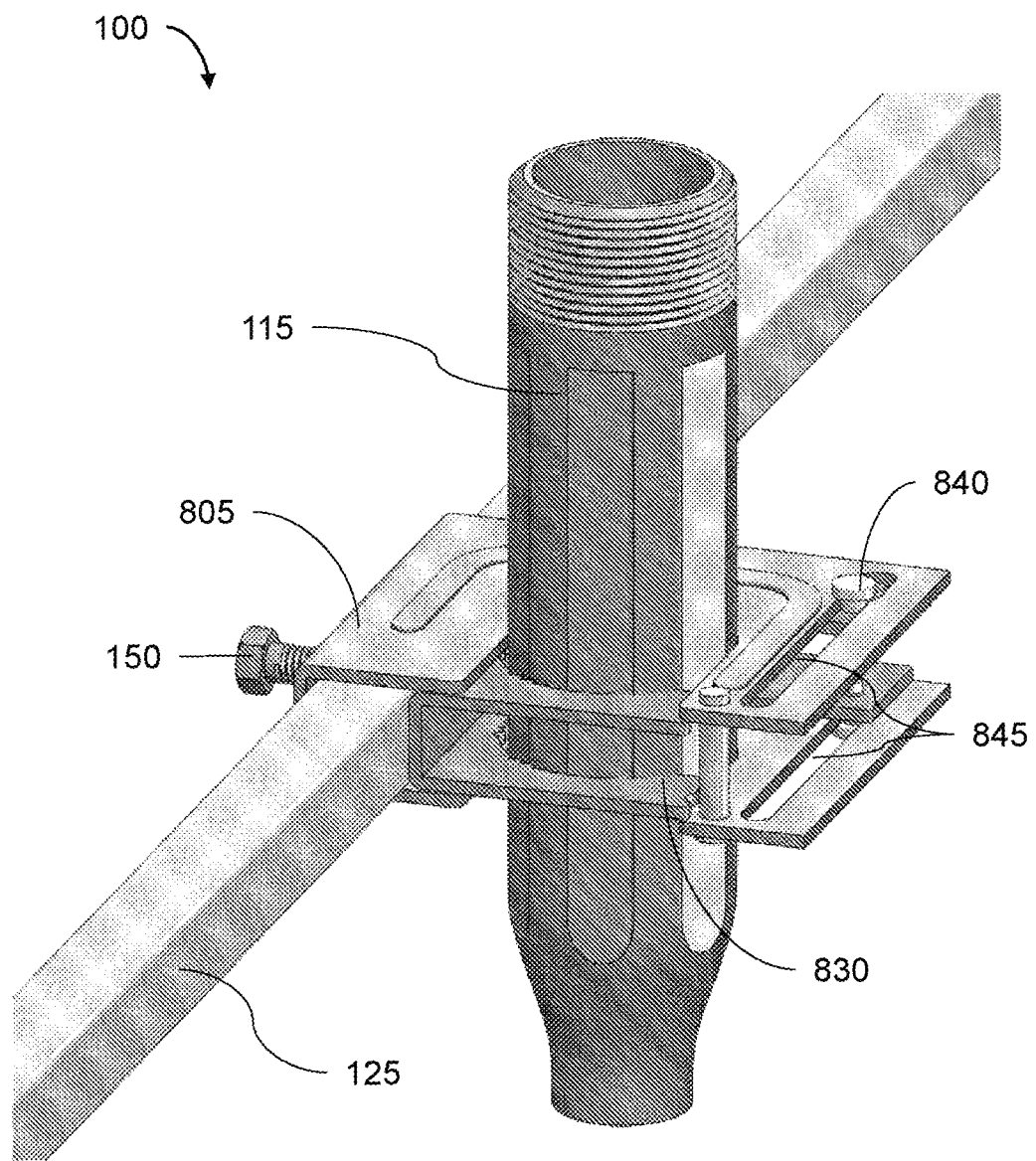
FIG. 8 depicts a perspective view of a portion of a flexible hose support bracket assembly, according to an exemplary implementation.

FIG. 8 depicts a flexible hose support bracket assembly 100. For example, the bracket assembly 100 can include an interior bracket portion 830. As shown in at least FIG. 9, the interior bracket portion 830 can include a recessed portion 916 to receive a portion of a flexible hose assembly 115. For example, the recessed portion 916 can include a hole, aperture, opening, or otherwise open space positioned on the interior bracket portion 830 for receiving a portion of the flexible hose assembly 115.

The bracket assembly 100 can include an exterior bracket portion 805. For example, the exterior bracket portion 805 can enclose the interior bracket portion 830. The exterior bracket portion 805 can receive a portion of a lateral support bar 125. For example, the exterior bracket portion 805 can include an opening for the lateral support bar 125 to be slid within the exterior bracket portion 805, as depicted in FIG. 8. The exterior bracket portion 805 can receive a portion of the lateral support bar 125 such that the lateral support bar 125 can be positioned between a portion of the exterior bracket portion 805 and a portion of the interior bracket portion 830, as depicted in FIG. 8.

The interior bracket portion 830 can be slidably coupled with the exterior bracket portion 805. For example, the interior bracket portion 830 can include a pin 840 coupled with the interior bracket portion 830. The pin 840 can slide within an aperture 845 positioned on the exterior bracket portion 805 such that the interior bracket portion 830 can slide in a lateral direction relative to the exterior bracket portion 805 between an open position and a closed position. For example, rather than pivoting about the pin 840, the interior bracket portion 830 can slide within the aperture 845 in a direction substantially parallel with the lateral support bar 125 such that the bracket assembly 100 reaches an open position, in which the bracket assembly 100 can receive a portion of the flexible hose assembly 115. The interior bracket portion 830 can slide within the aperture 845 such that the bracket assembly 100 reaches a closed position, in which the bracket assembly 100 cannot receive a portion of the flexible hose assembly 115, or the bracket assembly 100 can retain a portion of the flexible hose assembly 115 in position.

Figure 9:
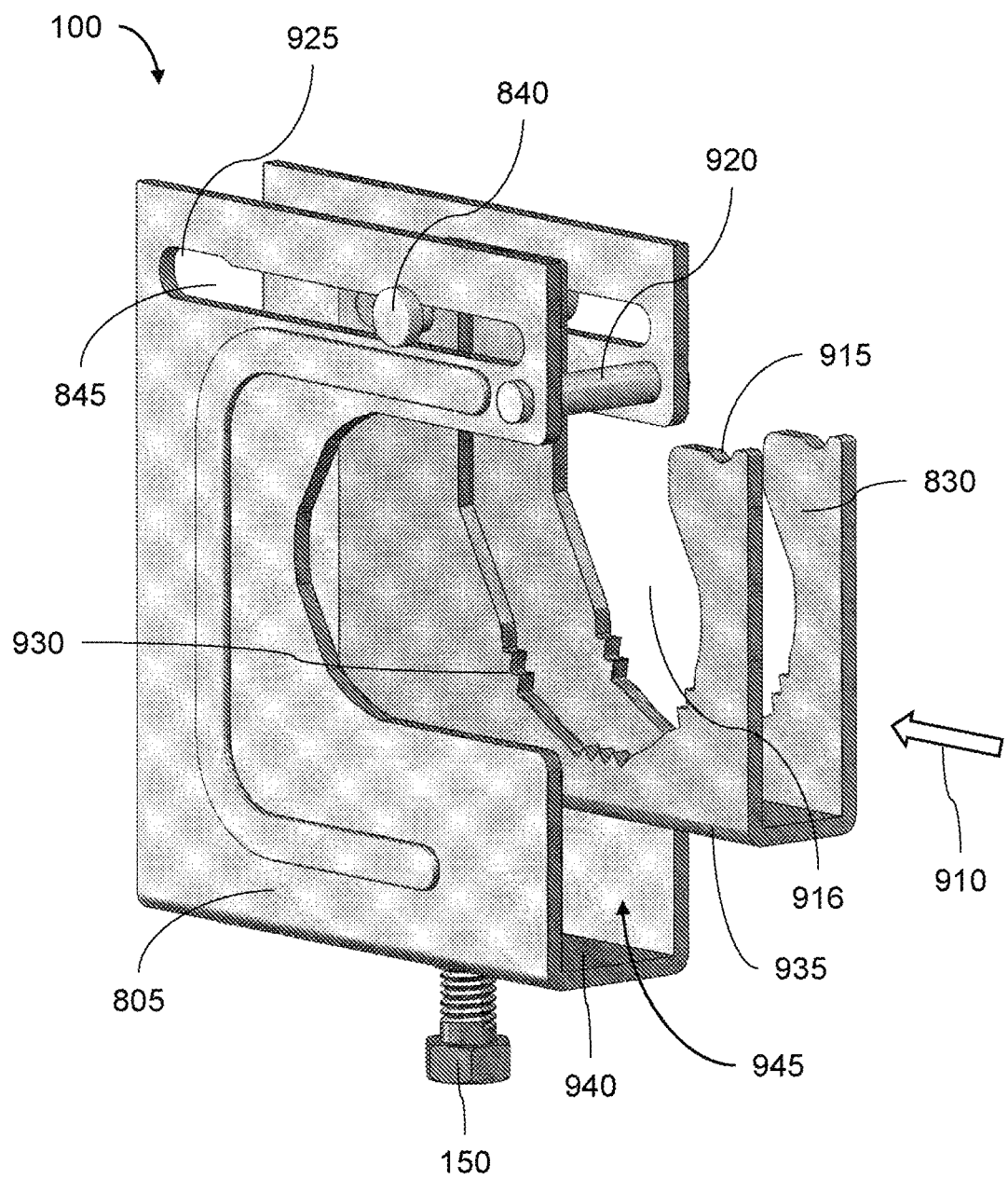
FIG. 9 depicts a perspective view of a portion of the flexible hose support bracket assembly of FIG. 8 in an open position, according to an exemplary implementation.
Figure 10:
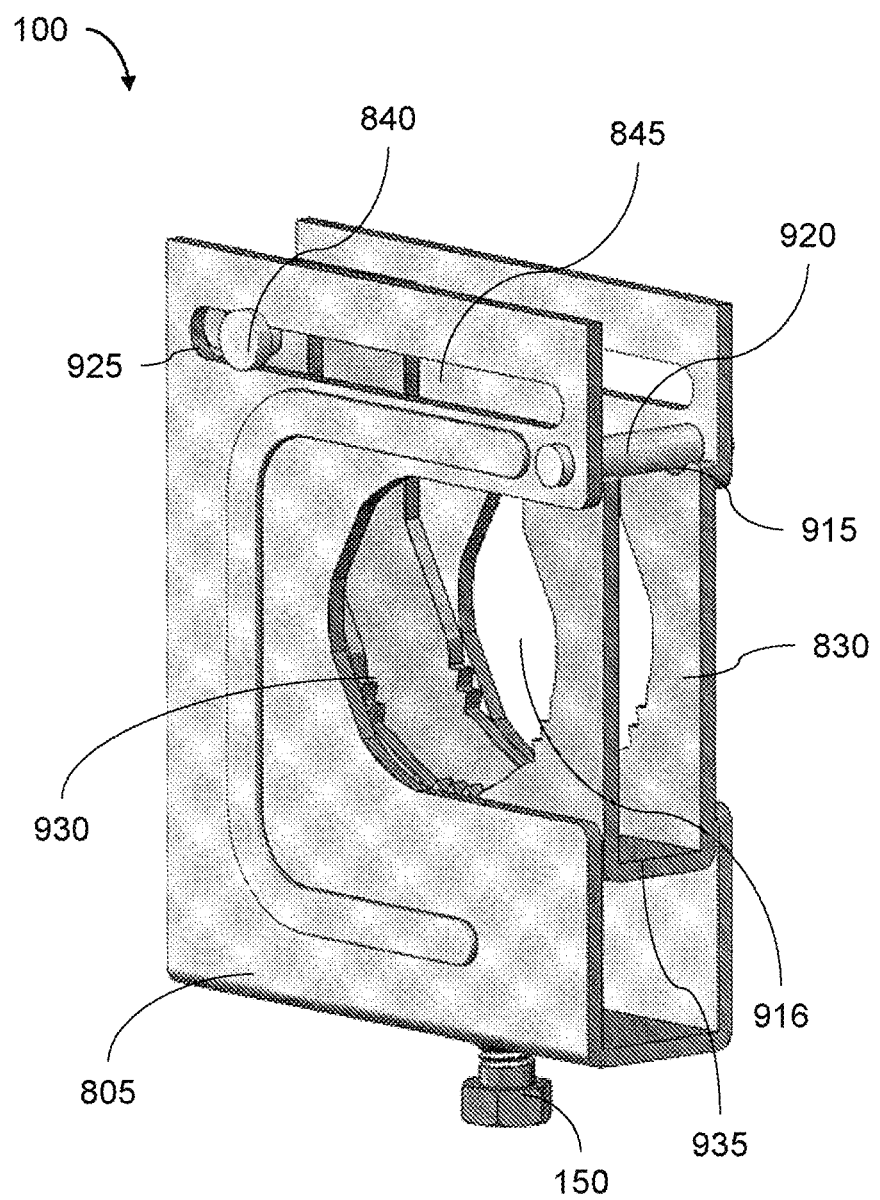
FIG. 10 depicts a perspective view of a portion of a flexible hose support bracket assembly of FIG. 8 in a closed position, according to an exemplary implementation.

As shown in FIGS. 9 and 10, the interior bracket portion 830 can include a stopper 920 coupled with the exterior bracket portion 805. For example, the stopper 920 can engage with a portion of the interior bracket portion 830 when the interior bracket portion 830 is moved into a closed position, as depicted by arrow 910. For example, the interior bracket portion 830 can include a divot 915 for the stopper 920 to engage when the interior bracket portion 830 is in the closed position.

Figure 9A:
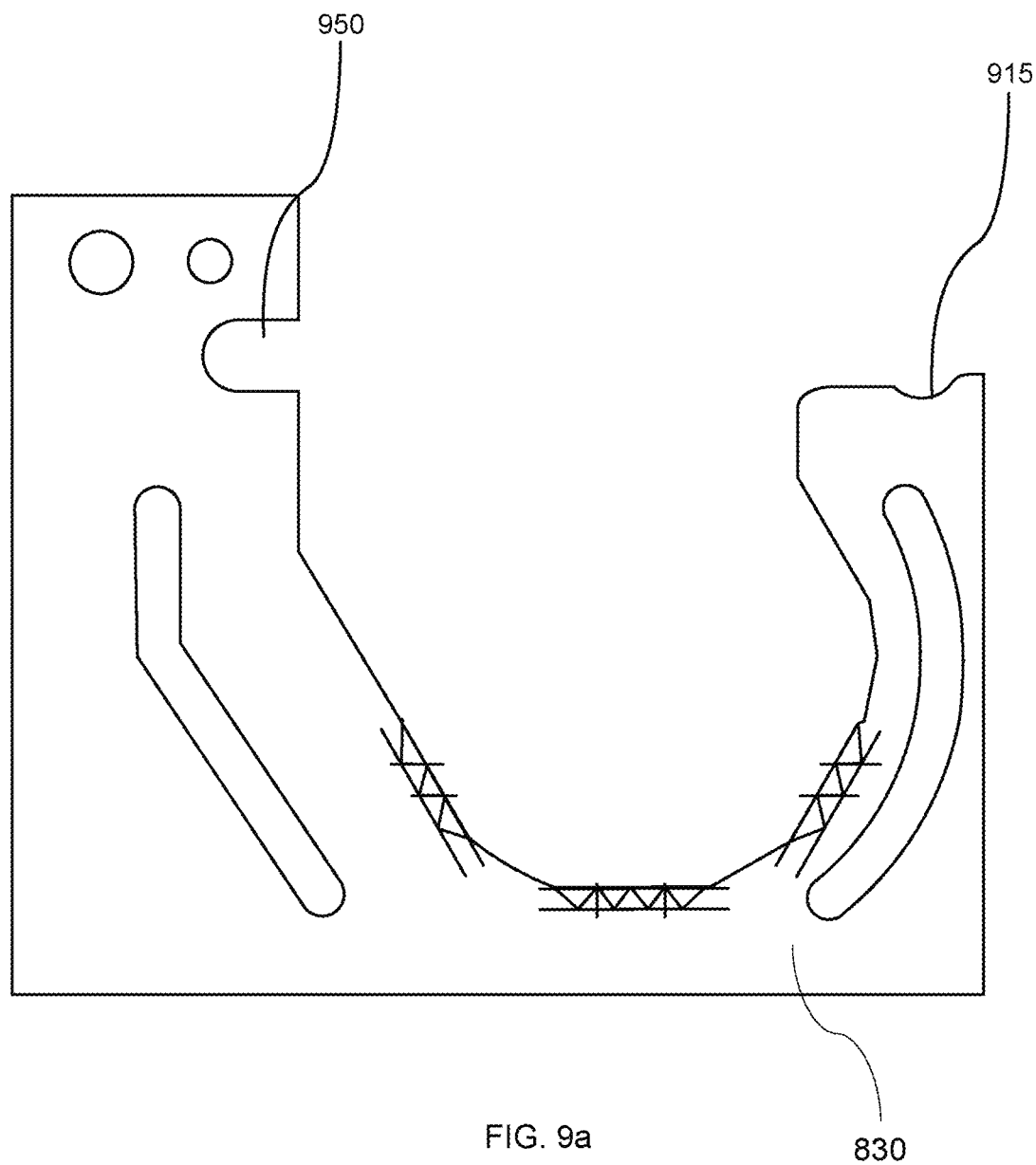
FIG. 9a depicts a schematic drawing of a portion of the flexible hose support bracket assembly of FIG. 8, according to an exemplary implementation.

The stopper 920 can engage with a portion of the interior bracket portion 830 when the interior bracket portion 830 is moved into an open position. For example, as depicted in FIG. 9a, the interior bracket portion 830 can include a cut-out 950 positioned along an edge of the interior bracket portion 830 such that the cut-out 950 can receive a portion of the stopper 920. For example, the cut-out 950 can be positioned along an edge of the interior bracket portion 830 that opposes the divot 915, as depicted in FIG. 9a.

The aperture 845 positioned on the exterior bracket portion 805 can include at least one notched portion 925 to prevent the interior bracket portion 830 from pivoting relative to the exterior bracket portion 805 when the interior bracket portion 830 is in the closed position. For example, the notched portion 925 can be positioned opposite the stopper 920 to prevent the interior bracket portion 830 from pivoting when the pin 840 is positioned within the notched portion 925, as shown in FIG. 10.

As shown in FIGS. 8-10, the bracket assembly 100 can include an actuator 150. The actuator 150 can facilitate movement of the lateral support bar 125 and the interior bracket portion 830 relative to the exterior bracket portion 805. For example, when the actuator 150 is activated, the actuator 150 can cause the lateral support bar 125 to move and engage with the interior bracket portion 830 such that the interior bracket portion 830 moves in a direction towards a portion of the flexible hose assembly 115 within the recessed portion 916 of the interior bracket portion 830 such a portion of the interior bracket portion 830 engages with a portion of the flexible hose assembly 115. When the actuator 150 is released, the actuator 150 can cause the lateral support bar 125 and the interior bracket portion 830 to move away from a portion of the flexible hose assembly 115 such that the interior bracket portion 830 may not engage with a portion of the flexible hose assembly 115. According to one example, the actuator 150 can be a fastener, as shown throughout the figures. In other examples, the actuator 150 can include various other components that facilitate movement of the interior bracket portion 830 between a compressed position and an uncompressed position.

The recessed portion 916 of the interior bracket portion 830 can include at least one serrated edge portion 930. For example, the serrated edge portion 930 can include a projection, protrusion, tooth, or otherwise jagged portion to engage with a portion of the flexible hose assembly 115 when a portion of the flexible hose assembly 115 is received by the interior bracket portion 830. The serrated edge portion 930 can engage with a portion of the flexible hose assembly 115 to facilitate retaining a portion of the flexible hose assembly 115 within the recessed portion 916 when the interior bracket portion 830 is in the closed position.

The interior bracket portion 830 can include at least one section 935 that abuts a portion of the lateral support bar 125. For example, when the exterior bracket portion 805 receives a portion of the lateral support bar 125 and the actuator 150 causes the lateral support bar 125 to move towards the recessed portion 916 that retains the flexible hose assembly 115, the section 935 of the interior bracket portion 830 can make contact with a portion of the lateral support bar 125 such that the interior bracket portion 830 can move relative to movement of the lateral support bar 125. The bracket assembly 100 can include an opening 945 (e.g., space, aperture) for receiving a portion of the lateral support bar 125. For example, the lateral support bar 125 can be slid between the section 935 of the interior bracket portion 830 and an interior section 940 of the exterior bracket portion 805 such that the lateral support bar 125 is received between the interior bracket portion 830 and the exterior bracket portion 805, as depicted in FIG. 8.

Figure 11:
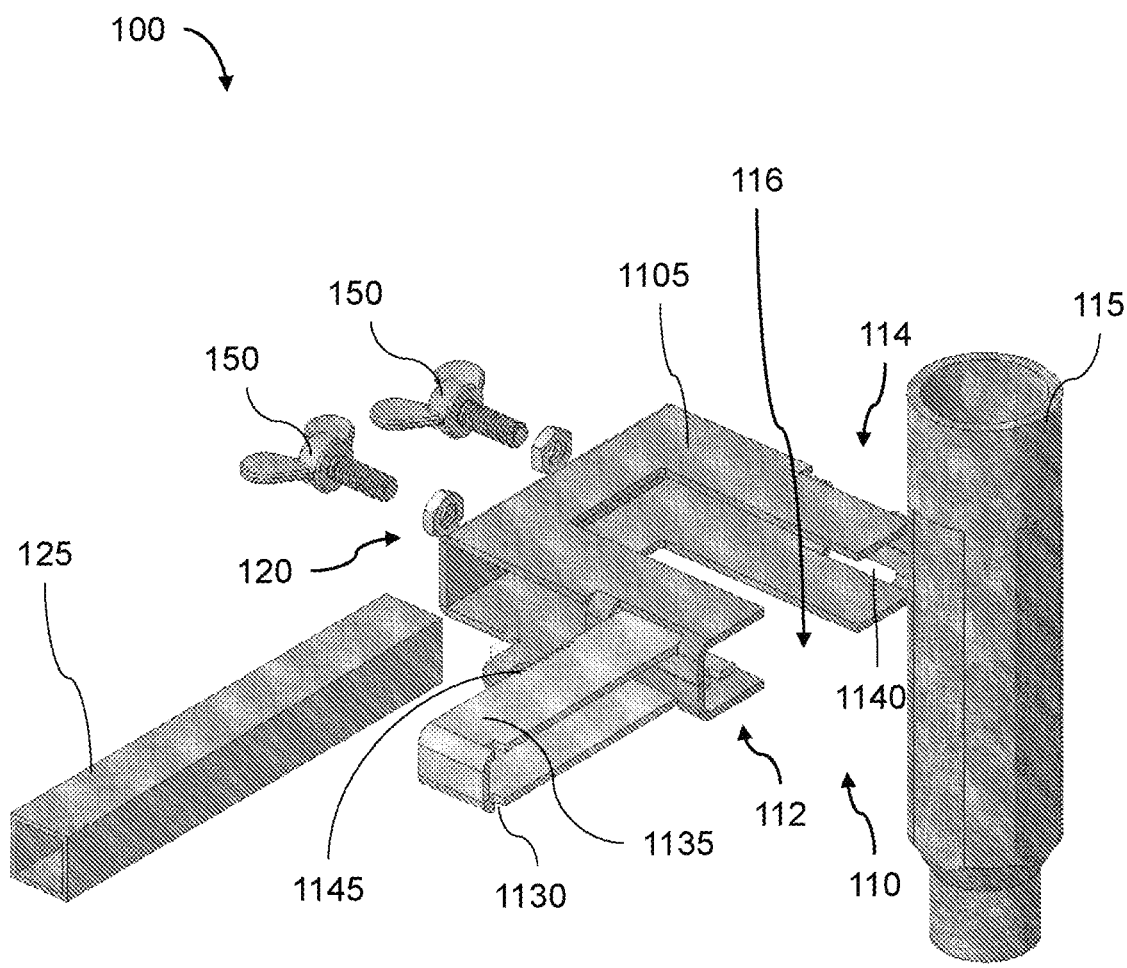
FIG. 11 depicts a perspective view of a flexible hose support bracket assembly in an open position, according to an exemplary implementation.
Figure 12:
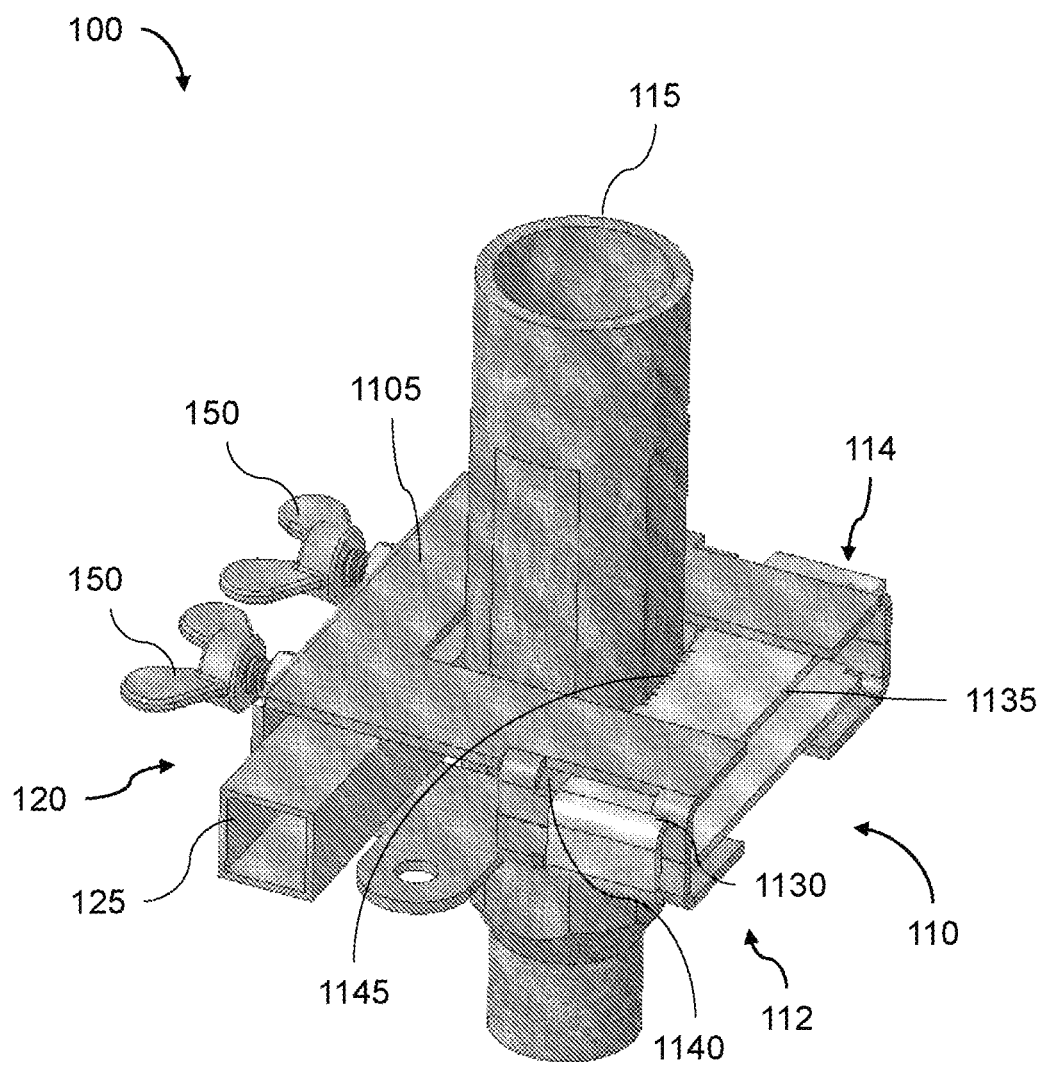
FIG. 12 depicts a perspective view of the flexible hose support bracket of FIG. 11 in a closed position, according to an exemplary implementation.

FIG. 11 depicts an example flexible hose support bracket assembly 100. For example, the bracket assembly 100 can include a first bracket portion 1105. The first bracket portion 1105 can include a first end 110 and a second end 120. The first end 110 can receive a portion of a flexible hose assembly 115. For example, the first end 110 can include a first protruding portion 112, a second protruding portion 114, and an opening 116 extending between the first protruding portion 112 and the second protruding portion 114. The opening 116 can receive a portion of the flexible hose assembly 115. For example, the flexible hose assembly 115 can include a portion of an outlet receiver to be coupled with a flexible hose for a fire sprinkler. The first protruding portion 112 and the second protruding portion 114 can be any struts, projections, teeth, or otherwise protruding sections that extend generally from the second end 120 of the first bracket portion 1105 to the first end 110 of the first bracket portion 1105 such that the first protruding portion 112 and the second protruding portion 114 can enclose a portion of the flexible hose assembly 115.

The second end 120 can receive a portion of a lateral support bar 125. The second end 120 can include one or more components for receiving a portion of the lateral support bar 125. For example, a portion of the lateral support bar 125 can slide into a side portion of the second end 120 of the first bracket portion 1105.

The flexible hose support bracket assembly 100 can include a sliding mechanism 1135. The sliding mechanism 1135 can slide between an open position and a closed position. For example, the sliding mechanism 1135 can slide such that the bracket assembly 100 reaches an open position in which a portion of the flexible hose assembly 115 can be received by the first end 110 of the first bracket portion 1105, as depicted in at least FIG. 11. The sliding mechanism 1135 can slide (e.g., in a lateral direction) such that the bracket assembly 100 reaches a closed position such that the bracket assembly 100 cannot receive a portion of the flexible hose assembly 115, or such that a portion of the flexible hose assembly 115 can be maintained within the opening 116, as depicted in at least FIG. 12.

As depicted in FIGS. 11-20, and among others, the first bracket portion 1105 can include a slot 1140 for receiving a portion of the sliding mechanism 1135. For example, the slot 1140 can be any aperture, hole, notch, or open space such that a portion of the sliding mechanism 1135 can fit within the slot 1140. The slot 1140 can inhibit the sliding mechanism 1135 from pivoting relative to the first bracket portion 1105. For example, the slot 1140 can be positioned on the second protruding portion 114 such that the slot 1140 prevents the sliding mechanism 1135 from moving in a direction that is substantially perpendicular to the lateral direction in which the sliding mechanism 1135 can move between the first protruding portion 112 and the second protruding portion 114.

The first bracket portion 1105 can include various amounts of slots 1140. For example, the first bracket portion 1105 can include four slots 1140 that each receive a portion of the sliding mechanism 1135. The sliding mechanism 1135 can include one or more bended sheets of material (e.g., metal or non-metal) such that the sliding mechanism 1135 includes an "n" shape having two extensions that extend between a closed end and an open end. The two extensions can protrude through at least one of the slots 1140 on a first side of the first bracket portion 1105 (e.g., on the first protruding portion 112) and can protrude through one of more slots 1140 on the second side (e.g., on the second protruding portion 114).

The sliding mechanism 1135 can include a notch 1130 for receiving a portion of the first bracket portion 1105. For example, the notch 1130 can be any aperture, hole, slot, or otherwise open space such that a portion of the first bracket portion 1105 can fit within the notch 1130. For example, the notch 1130 can receive a portion of the first bracket portion 1105 that surrounds the slot 1140, as depicted in at least FIG. 12. For example, a portion of the sliding mechanism 1135 can slide into the slot 1140 and the sliding mechanism 1135 can move in a direction that is perpendicular to an axial direction of the lateral support bar 125 such that the notch 1130 at least partially surrounds a portion of the first bracket portion 1105. The notch 1130 can receive a portion of the first bracket portion 1105 in the closed position.

The sliding mechanism 1135 can include any amount of notches 1130. For example, the sliding mechanism 1135 can include four notches 1130 that can each engage (e.g., contact, touch, receive) a portion of the first bracket portion 1105 that surrounds or is adjacent to a slot 1140.

An actuator 150 can facilitate movement of the lateral support bar 125 relative to the first bracket portion 1105 relative to the first bracket portion 1105. For example, when the actuator 150 is activated, the actuator 150 can cause the lateral support bar 125 to move within the bracket assembly 100 in a direction towards a portion of the flexible hose assembly 115 within the opening 116 such that a portion of the lateral support bar 125 engages with a portion of the flexible hose assembly 115. When the actuator 150 is released, the actuator 150 can cause the lateral support bar 125 to move away from a portion of the flexible hose assembly 115 such that a portion of the lateral support bar 125 may not engage with a portion of the flexible hose assembly 115 within the opening 116. According to one example, the actuator 150 can be a fastener, such as a screw. The first bracket portion 1105 can include multiple actuators 150.

The sliding mechanism 1135 can include one or more serrated edge portions 1145. The serrated edge portion 1145 can include a protrusion, projection, tooth, or otherwise jagged portion to engage with a portion of the flexible hose assembly 115 when the actuator 150 compresses the lateral support bar 125 towards a portion of the flexible hose assembly 115. The serrated edge portion 1145 can engage with a portion of the flexible hose assembly 115 such that a portion of the flexible hose assembly 115 maintains within the opening 116 when the bracket assembly 100 is in the closed position.

Figure 13:
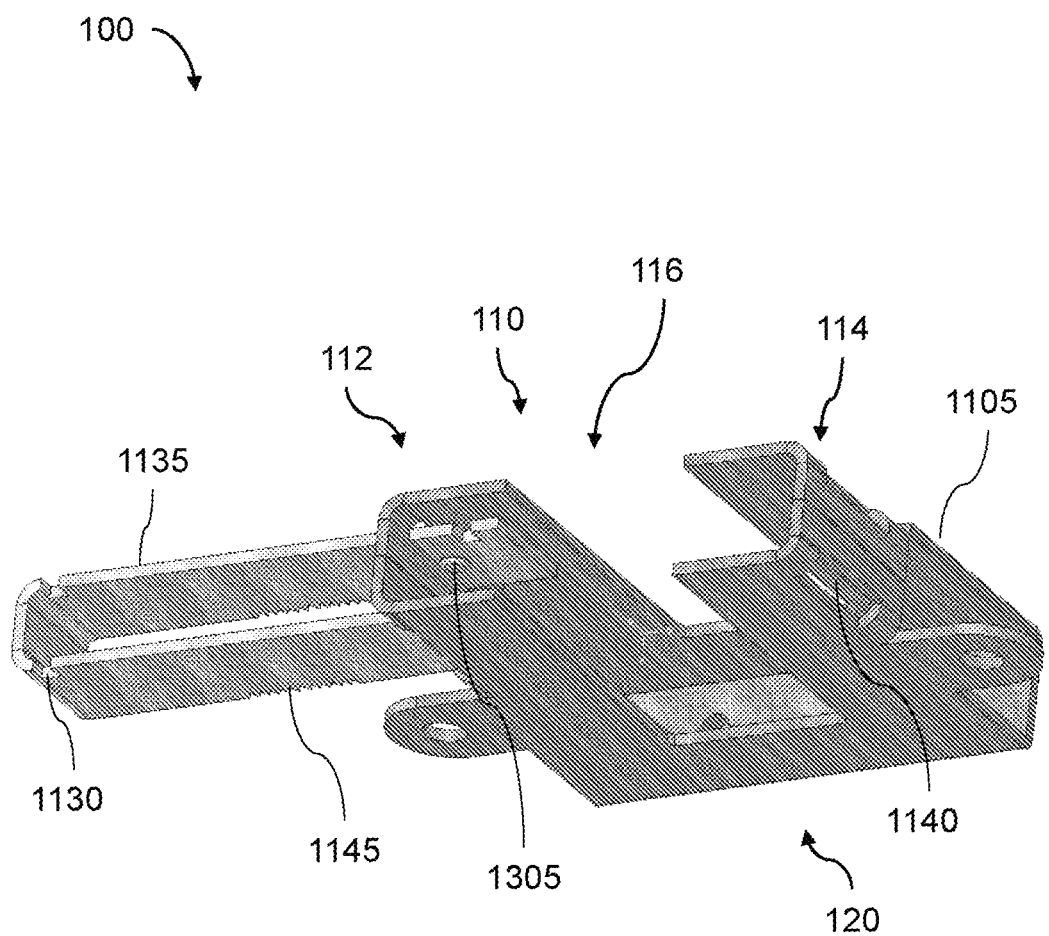
FIG. 13 depicts a perspective view of a portion of the flexible hose support bracket of FIG. 11 in an open position, according to an exemplary implementation.

FIG. 13 depicts a perspective view of a portion of the flexible hose support bracket assembly 100. The sliding mechanism 1135 can include one or more pins 1305 that can couple with the sliding mechanism 1135. The pin 1305 can facilitate preventing removal of the sliding mechanism 1135 from the first bracket portion 1105. For example, the pin 1305 can include a depth that is greater than a depth of the one or more slots 1140 such that the pin 1305 cannot pass through the slots 1140.

Figure 14:
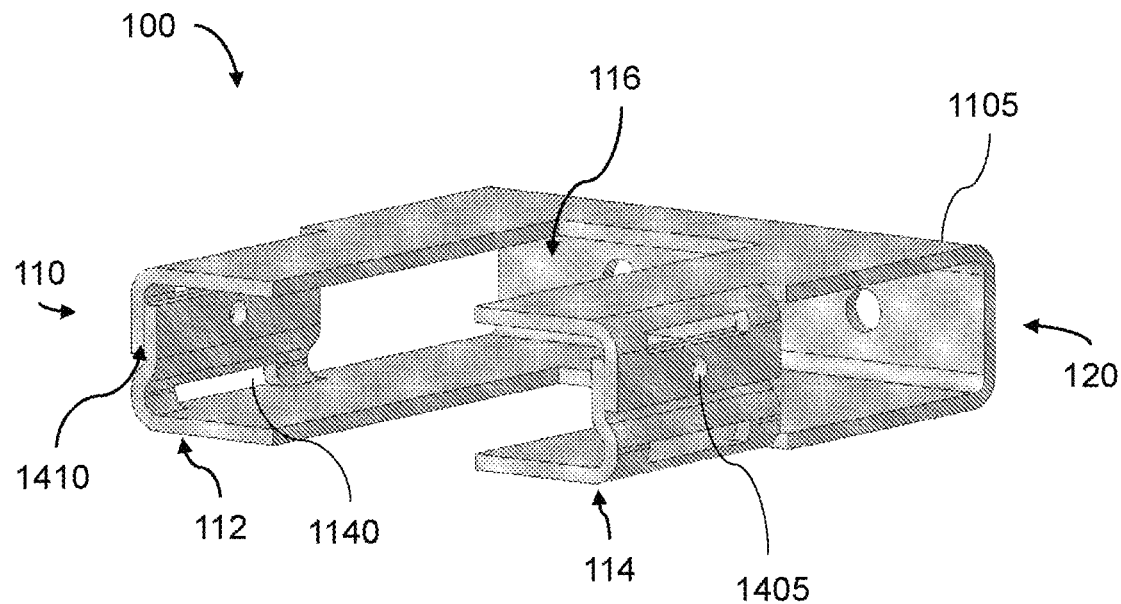
FIG. 14 depicts a perspective view of a portion of the flexible hose support bracket of FIG. 11, according to an exemplary implementation.
Figure 15:
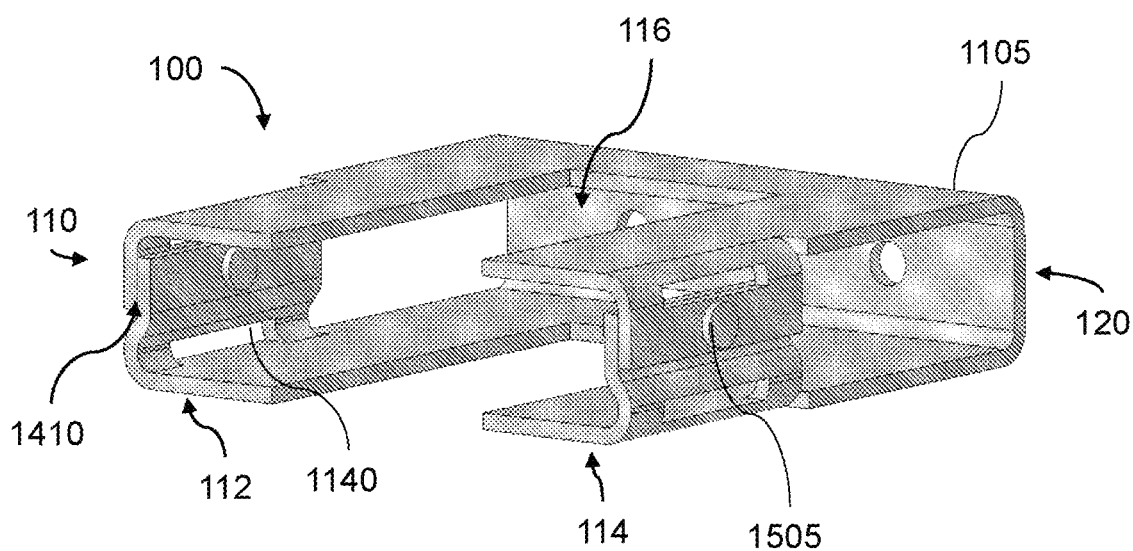
FIG. 15 depicts a perspective view of a portion of the flexible hose support bracket of FIG. 11, according to an exemplary implementation.

FIG. 14 and FIG. 15 depict perspective views of a portion of the flexible hose support bracket assembly 100. The first bracket portion 1105 can include one or more lap joints 1410. For example, at least a portion of the first bracket portion 1105 can include one or more separate portions that overlap one another (e.g., a top portion and a bottom portion). The two overlapping portions can align by one or more holes 1405 or other aligning features. The two overlapping portions can couple by one or more fasteners 1505 (e.g., rivets) to form the lap joint 1410. The lap joint 1410 can facilitate reducing deflection of the first protruding portion 112 or the second protruding portion 114.

Figure 16:
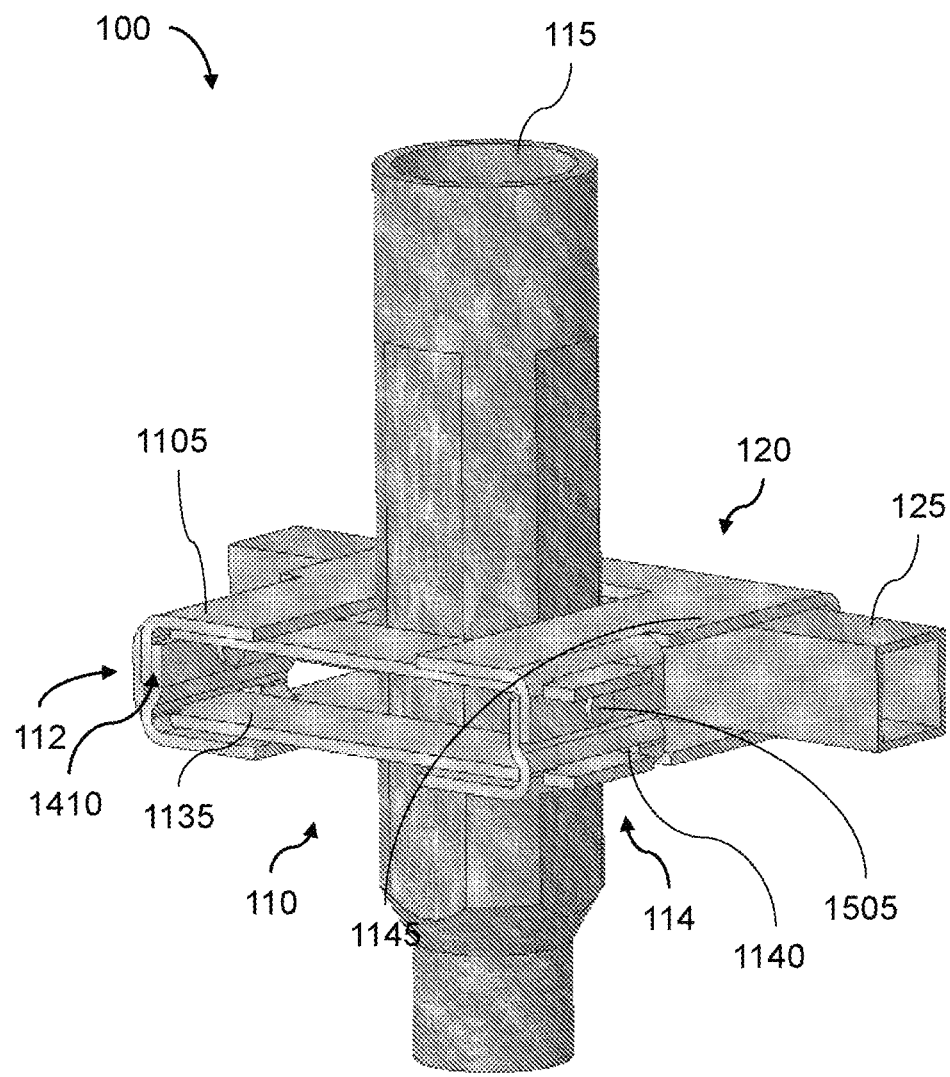
FIG. 16 depicts a perspective view of the flexible hose support bracket of FIG. 11 assembly in a closed position, according to an exemplary implementation.

FIG. 16 depicts a perspective view of the flexible hose support bracket assembly 100 in a closed position. The fasteners 1505 (e.g., rivets) can facilitate reducing separation between one or more portions of the first bracket portion 1105 during loading (e.g., eliminate separation between the top portion and the bottom portion of the first bracket portion 1105).

Figure 17:
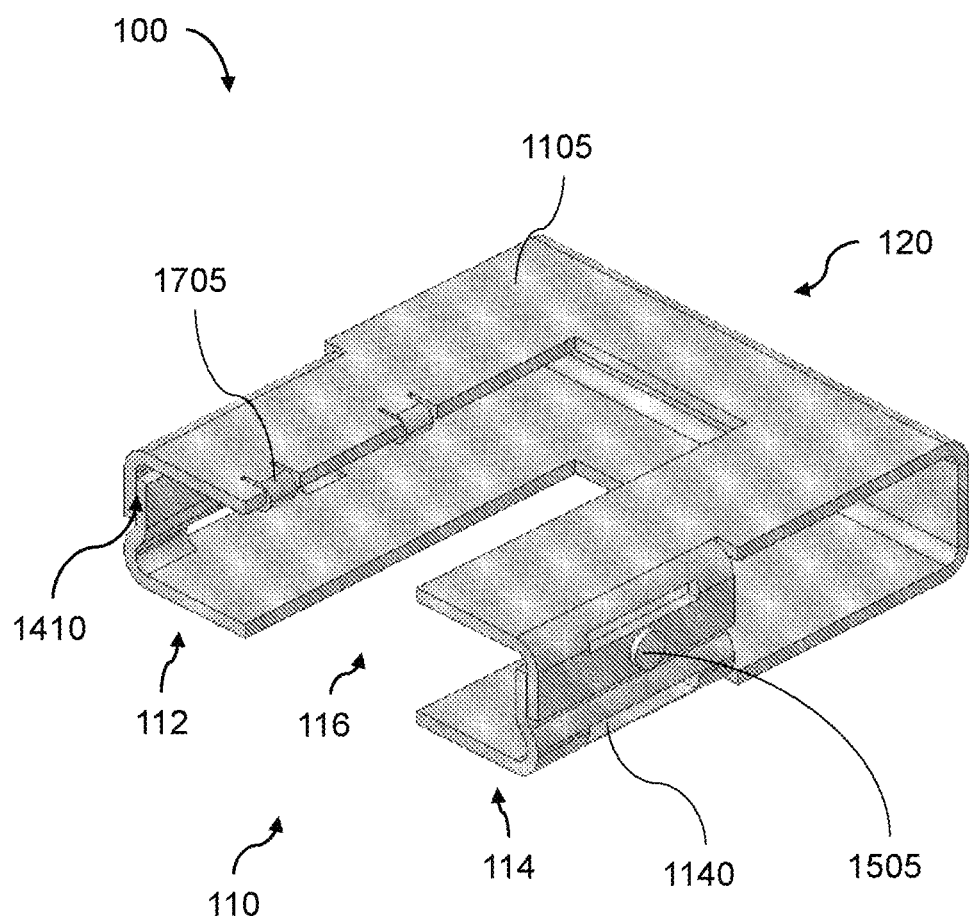
FIG. 17 depicts a perspective view of a portion of the flexible hose support bracket of FIG. 11, according to an exemplary implementation.
Figure 18:
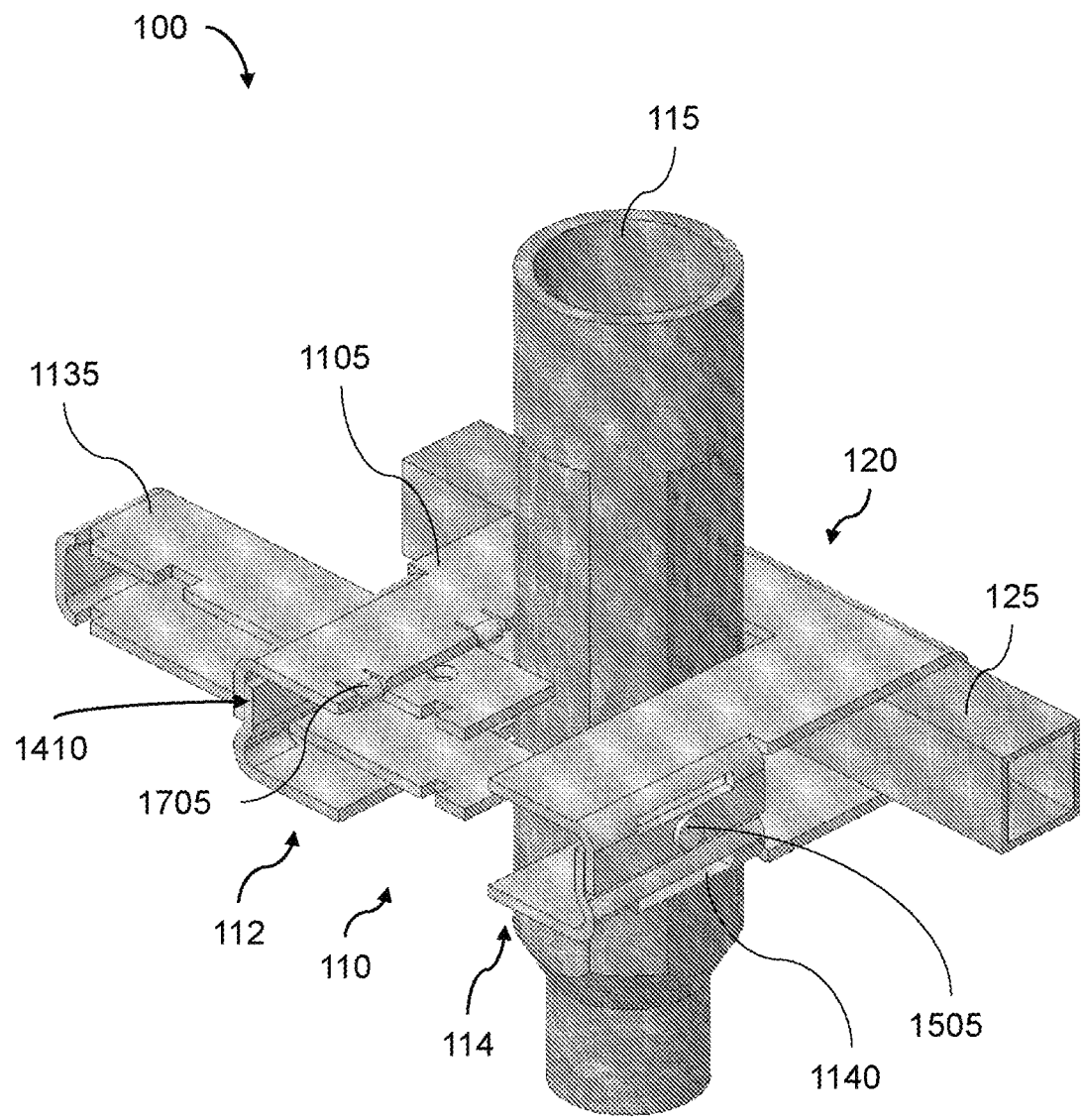
FIG. 18 depicts a perspective view of the flexible hose support bracket of FIG. 11 in an installation position, according to an exemplary implementation.

FIG. 17 and FIG. 18 depict perspective views of a portion of the flexible hose support bracket assembly 100. The first bracket portion 1105 can include at least one guide tab 1705. For example, the guide tab 1705 can be or can include one or more tabs that protrude from a portion of the first bracket portion 1105. The guide tabs 1705 can facilitate reducing pivoting of the slider mechanism during installation (e.g., moving between the open or closed position). For example, the first bracket portion 1105 can include at least two guide tabs 1705 disposed on either side of the sliding mechanism 1135 such that a portion of the sliding mechanism 1135 can engage (e.g., contact, abut, etc.) a portion of the guide tabs 1705 such that the guide tabs 1705 guide the sliding mechanism 1135 to slide in a linear direction.

Figure 19:
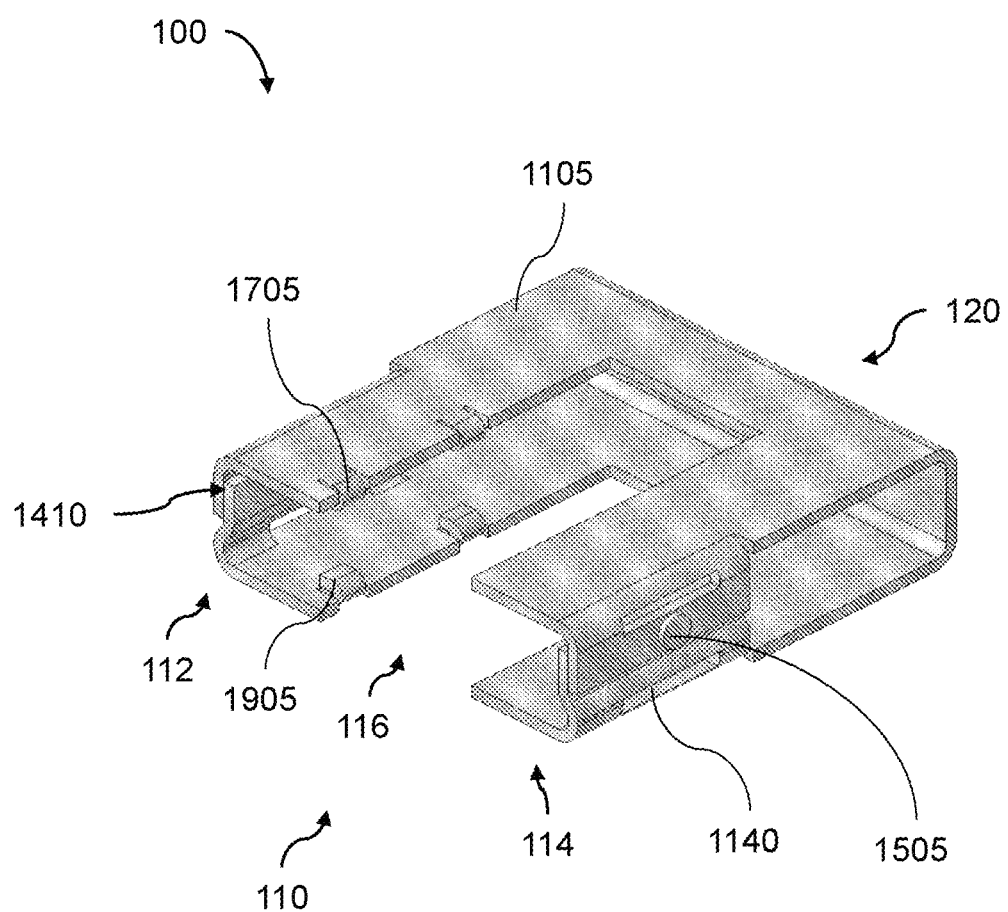
FIG. 19 depicts a perspective view of a portion of the flexible hose support bracket of FIG. 11, according to an exemplary implementation.
Figure 20:
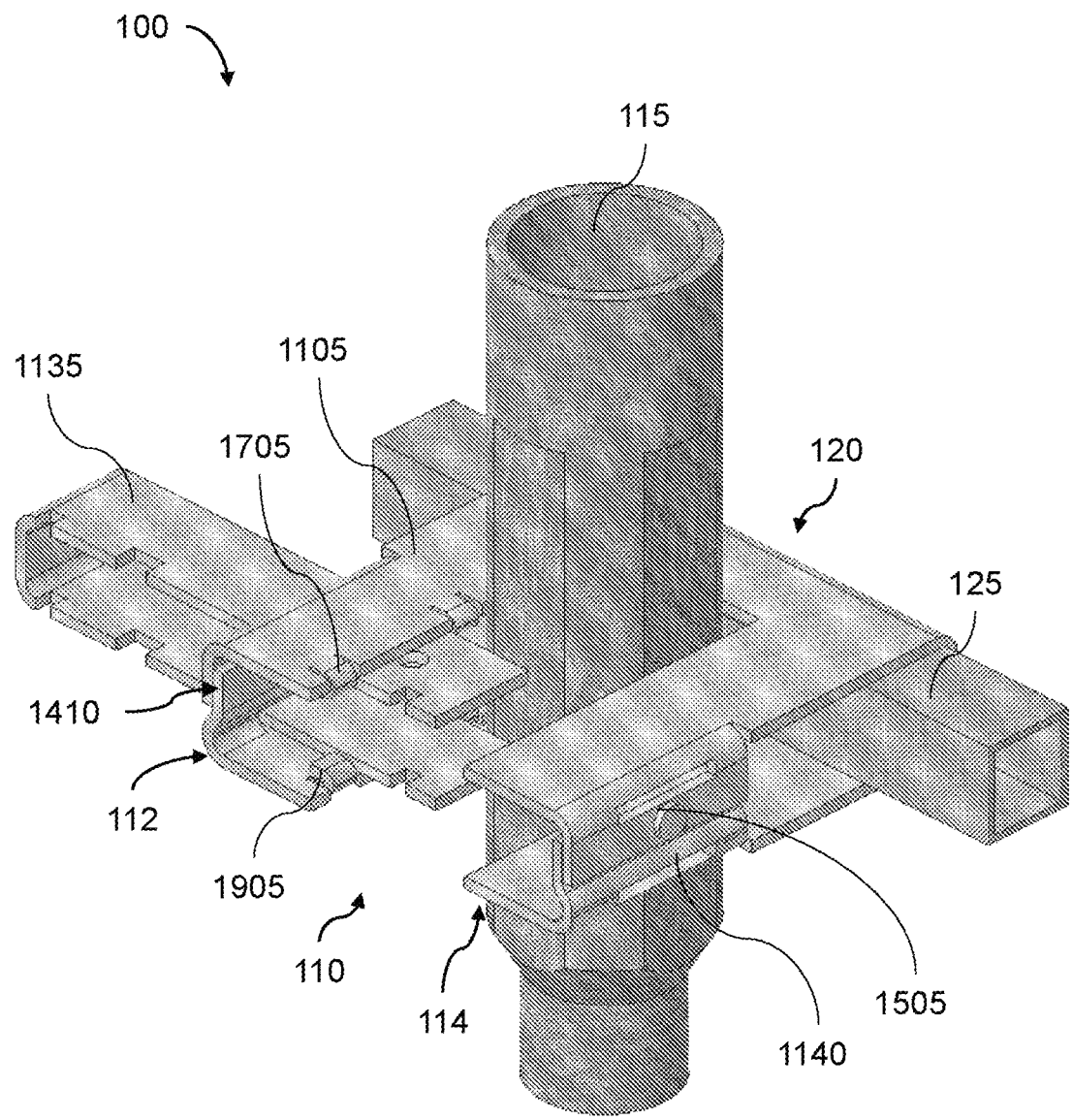
FIG. 20 depicts a perspective view of the flexible hose support bracket of FIG. 11 in an installation position, according to an exemplary implementation.

FIGS. 19 and 20 depict perspective views of a portion of the flexible hose support bracket assembly 100. The first bracket portion 1105 can include at least one guide tab 1705 disposed on the top portion of the first bracket portion 1105 and at least one guide tab 1905 disposed on the bottom portion of the first bracket portion 1105. The guide tabs 1705, 1905 can be the same in shape or size or can differ. The bottom guide tabs 1905 can facilitate guiding the sliding mechanism 1135 in a linear direction.

Figure 21:
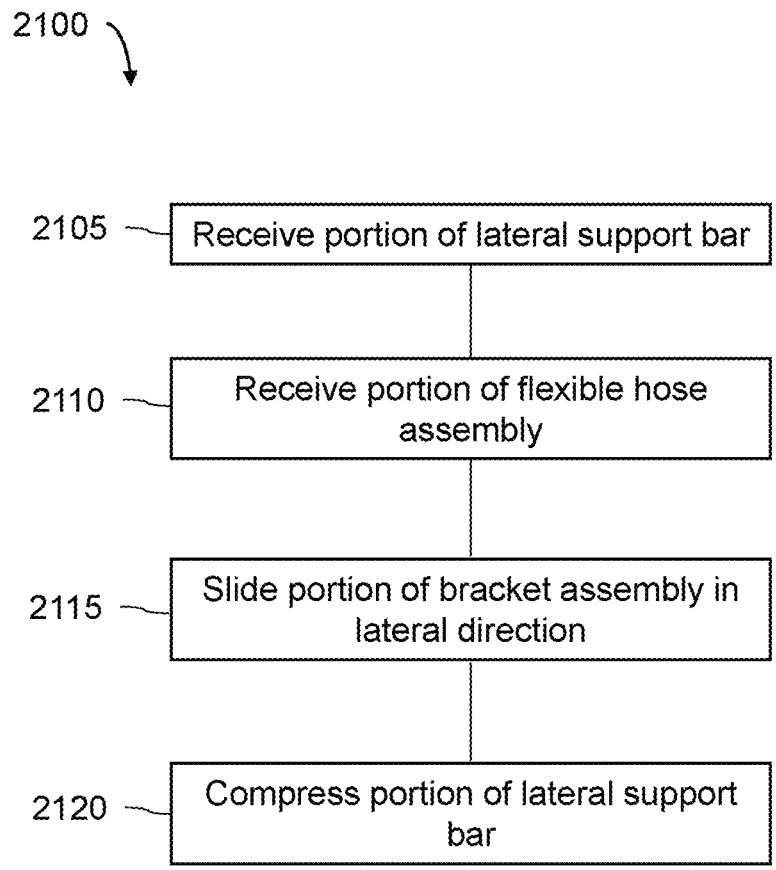
FIG. 21 depicts an illustration of a process of supporting a flexible hose assembly, according to an exemplary implementation.

FIG. 21 depicts a method 2100 of supporting a flexible hose assembly 115. The method 2100 can include receiving a portion of a lateral support bar 125, as depicted in act 2105. For example, a flexible hose support bracket assembly 100 can receive a portion of the lateral support bar 125 in various ways. For example, the bracket assembly 100 can receive a portion of the lateral support bar 125 through a side portion of the bracket assembly 100 such that the lateral support bar 125 is slid through a portion of the bracket assembly 100.

The method 2100 can include receiving a portion of the flexible hose assembly 115, as depicted in act 2110. The bracket assembly 100 can receive a portion of the flexible hose assembly 115 in various ways. For example, the bracket assembly 100 can include a first protruding portion 112, a second protruding portion 114, and an opening 116 extending between the first protruding portion 112 and second protruding portion 114 such that the opening 116 can receive a portion of the flexible hose assembly 115. As another example, the bracket assembly 100 can include a recessed portion 916 positioned on an interior bracket portion 830 such that the recessed portion 916 can receive a portion of the flexible hose assembly 115.

The method 2100 can include sliding a portion of the bracket assembly 100 in a lateral direction, as depicted in act 2115. A portion of the bracket assembly 100 can slide in various ways. For example, the bracket assembly 100 can include a sliding mechanism 135 coupled with the bracket assembly 100 by a pin 140. The sliding mechanism 135 can include an aperture 145 for receiving the pin 140 such that the sliding mechanism 135 can slide in a lateral direction relative to the bracket assembly 100 by the pin 140 along the aperture 145. As another example, the bracket assembly 100 can include an aperture 845 positioned on the interior bracket portion 830 and coupled to an exterior bracket portion 805 by a pin 840. The interior bracket portion 830 can slide in a lateral direction relative to the exterior bracket portion 805 by the pin 840 along the aperture 845. The bracket assembly 100 can slide between an open position and a closed position. For example, the bracket assembly 100 can slide between an open position, in which the bracket assembly 100 can receive a portion of the flexible hose assembly 115, and a closed position, in which the bracket assembly 100 cannot receive a portion of the flexible hose assembly 115 or in which the bracket assembly 100 maintains a portion of the flexible hose assembly 115 in place.

The bracket assembly 100 can include at least one component to prevent the bracket assembly 100 from pivoting. For example, the bracket assembly 100 can include a stopper 405 and a notch 610 to receive the stopper 405 coupled with the sliding mechanism 135 such that the stopper 405 prevents the sliding mechanism 135 from pivoting relative to first bracket portion 105. As another example the bracket assembly 100 can include a stopper 920 coupled with the exterior bracket portion 805 and a divot 915 positioned on the interior bracket portion 830 such that the stopper 920 engages with the divot 915 to prevent the interior bracket portion 830 from pivoting relative to the exterior bracket portion 805.

The method 2100 can include compressing a portion of the lateral support bar 125, as depicted in act 2120. For example, the bracket assembly 100 can include an actuator 150. The actuator 150 can actuate the bracket assembly 100 between a compressed position, in which a portion of the bracket assembly 100 engages (e.g., applies pressure) with a portion of the flexible hose assembly 115 such that the portion of the flexible hose assembly 115 maintains position within the bracket assembly 100, and an uncompressed portion, in which the bracket assembly 100 does not engage with the flexible hose assembly 115.

As utilized herein, the terms "approximately," "about," "substantially", and similar terms are intended to include any given ranges or numbers+/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the bracket assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A flexible hose support bracket assembly, comprising:
  a first bracket portion, including:
    a first end with a first protruding portion, a second protruding portion, and an opening extending therebetween, the opening to receive a portion of a flexible hose assembly, and a second end to receive a portion of a lateral support bar;
a second bracket portion slidably coupled with the first bracket portion;
a sliding mechanism slidably coupled with the first bracket portion by at least one pin, the sliding mechanism including an aperture to receive the at least one pin; and
the sliding mechanism to move in a lateral direction between the first protruding portion and the second protruding portion of the first end of the first bracket portion about the at least one pin between an open position and a closed position.

2. The flexible hose support bracket assembly of claim 1, comprising:
the first bracket portion includes a slot positioned at the first end to receive a portion of the sliding mechanism; and
the slot to inhibit the sliding mechanism from pivoting relative to the first bracket portion.

3. The flexible hose support bracket assembly of claim 1, comprising:
the first bracket portion includes a notch positioned at the first end to receive a portion of the sliding mechanism; and
the notch to inhibit the sliding mechanism from pivoting relative to the first bracket portion.

4. The flexible hose support bracket assembly of claim 1, comprising:
an actuator to facilitate movement of the second bracket portion between a compressed position and an uncompressed position.

5. The flexible hose support bracket assembly of claim 4, comprising:
the actuator coupled with the second end of the first bracket portion.

6. The flexible hose support bracket assembly of claim 1, comprising:
the flexible hose assembly includes an outlet reducer to connect to a flexible hose.

7. The flexible hose support bracket assembly of claim 1, comprising:
the second bracket portion includes a recessed portion to interface with the portion of the flexible hose assembly within the closed position; and
the recessed portion includes a serrated edge to retain the portion of the flexible hose assembly within the opening.

8. The flexible hose support bracket assembly of claim 1, comprising:
the first bracket portion to fully enclose the second bracket portion; and
the second bracket portion to receive the lateral support bar such that the lateral support bar includes at least one portion flush with the second bracket portion.

9. The flexible hose support bracket assembly of claim 1, comprising:
the sliding mechanism includes at least one serrated edge portion to engage with the portion of the flexible hose assembly within the closed position.

10. A flexible hose support bracket assembly, comprising:
an interior bracket portion including a recessed portion to receive a portion of a flexible hose assembly;
an exterior bracket portion that encloses the interior bracket portion, the exterior bracket portion to receive a portion of a lateral support bar;
the interior bracket portion slidably coupled with the exterior bracket portion by at least one pin movable within an aperture positioned on the exterior bracket portion;
the interior bracket portion to move in a lateral direction within the aperture between an open position and a closed position; and
an actuator to facilitate movement of the lateral support bar between a compressed position and an uncompressed position.

11. The flexible hose support bracket assembly of claim 10, comprising:
a stopper coupled with the exterior bracket portion to inhibit movement of the interior bracket portion within the closed position.

12. The flexible hose support bracket assembly of claim 10, comprising:
the aperture positioned on the exterior bracket portion includes at least one notched portion to inhibit the interior bracket portion pivoting relative to the exterior bracket portion.

13. The flexible hose support bracket assembly of claim 10, comprising:
the actuator is at least one of a screw or bolt to facilitate engagement of the portion of the flexible hose assembly received by the exterior bracket portion.

14. The flexible hose support bracket assembly of claim 10, comprising:
the recessed portion of the interior bracket portion includes at least one serrated edge portion to inhibit the portion of the flexible hose assembly from moving within the closed position.

15. The flexible hose support bracket assembly of claim 10, comprising:
the interior bracket portion includes at least one portion that abuts the lateral support bar;
an opening defined between the portion of the interior bracket portion that abuts the lateral support bar and a portion of the exterior bracket portion; and
the opening to receive the lateral support bar.

16. A method of securing a flexible hose assembly, comprising:
receiving, via a bracket assembly, a portion of a lateral support bar;
receiving, via the bracket assembly, a portion of the flexible hose assembly;
sliding, via a slide mechanism, a first end of the bracket assembly in a lateral direction relative to a second end of the bracket assembly from an open position to a closed position;
compressing, via an actuator, the bracket assembly to inhibit movement of the portion of the flexible hose assembly within the bracket assembly; and
preventing, via a notched portion, the slide mechanism from pivoting relative to the lateral support bar.

17. The method of claim 16, wherein:
a first bracket portion of the bracket assembly receives the portion of the flexible hose assembly; and
a second bracket portion of the bracket assembly receives the portion of the lateral support bar.

18. The method of claim 16, wherein the slide mechanism comprises:
a pin coupled with the bracket assembly;
an aperture positioned on the slide mechanism for receiving the pin; and at least one notched portion within the aperture for inhibiting pivotal movement of the bracket assembly relative to the lateral support bar.

* * * * *